United States Patent [19]
Mickelson

[11] 3,802,771
[45] Apr. 9, 1974

[54] MICROFILM HANDLING APPARATUS

[75] Inventor: Micheal J. Mickelson, Saint Paul, Minn.

[73] Assignee: Minnesota Mining and Manufacturing Company, Saint Paul, Minn.

[22] Filed: Jan. 6, 1972

[21] Appl. No.: 215,867

[52] U.S. Cl. .................................................. 353/26
[51] Int. Cl. ....................... G03b 21/11, G03b 23/12
[58] Field of Search ...... 353/25, 26, 27; 250/219 D; 340/172.5

[56] References Cited

UNITED STATES PATENTS

| | | | |
|---|---|---|---|
| 3,586,430 | 6/1971 | Rempala | 353/95 |
| 3,596,253 | 7/1971 | Ruth | 340/172.5 |
| 3,700,320 | 10/1971 | Brewer | 353/26 |
| 3,299,272 | 1/1967 | Furukawa | 250/219 D |

FOREIGN PATENTS OR APPLICATIONS

| | | | |
|---|---|---|---|
| 1,288,335 | 1/1969 | Germany | 353/27 |

*Primary Examiner*—Louis R. Prince
*Assistant Examiner*—A. Jason Mirabito
*Attorney, Agent, or Firm*—Alexander, Sell, Steldt & Delahunt

[57] ABSTRACT

Accurate control of motion of a microfilm web is obtained by providing a power supply system which includes two controllable sources of power at taps which are electrically equidistant from a center tap of a nonlinear voltage divider network connected between equal positive and negative potential outputs with respect to ground, wherein the center tap is connected to a comparing network which compares a control signal indicative of desired web transport speed and direction with a web motion signal indicative of actual web transport speed and direction, and receives an error signal produced by the comparing network indicative of the difference between the compared signals, and by electrically coupling the two controllable sources of power to drive motors for differentially driving the supply and takeup reels in accordance with the error signal.

Precise centering of a predetermined image frame of a microfilm web in a viewing station is provided by two abutting photocells positioned for sensing position markers on the microfilm web adjacent each image frame, each photocell having an effective sensing diameter which is not greater than one-half the dimension of the position marker parallel to the direction of travel of the microfilm web and by an automatic centering network coupled to the photocells for comparing position signals produced by the photocells and for producing a signal for stopping the drive motors when this comparison indicates that a position marker is positioned over one photocell and not over the other photocell such that a first edge of the position marker is positioned between the photocells.

32 Claims, 17 Drawing Figures

MICROFILM HANDLING APPARATUS

BACKGROUND OF THE INVENTION

1. Field of the Invention

This invention relates to an improvement in data processing systems such as a microfilm handling apparatus, wherein optical-mechanical image storage and readout devices automatically locate and position a predetermined image frame of a microfilm web in a viewing station. In one aspect, the present invention is directed to accurately controlling the motion of the microfilm web and in another aspect the present invention is directed to precisely centering the predetermined image frame in the viewing station.

2. Description of the Prior Art

The improved microfilm handling apparatus of the present invention has certain features which are common to the prior art. The microfilm is contained on supply and takeup reels which are supported by rotatable supporting members, such as spindles, so that the film web may be transported through a viewing station. The viewing station includes a light source and optical elements defining a focal plane in which the predetermined microfilm image frame is positioned for projection of an image therefrom. The reels are separately driven by identical supply and takeup reel drive motors in accordance with currents furnished to the drive motors from a power supply system. The power supply system is controlled by an error signal provided by a comparing network. The error signal is produced in response to a comparison of a web motion signal indicative of the actual web transport speed and direction, with a control signal indicative of the desired web transport speed and direction. The web motion signal is provided by a sensing device and the control signal is provided by a control device. The predetermined image frame is located in the viewing station by counting position markers which may be located on one edge of the web and adjacent each image frame, and by providing control signals in accordance with such count for controlling the drive motors. The marker count is provided by light detectors such as photocells positioned within the viewing station adjacent the focal plane.

The typical prior art microfilm handling apparatus having means for controlling microfilm web motion and for locating a predetermined microfilm image frame in a viewing station, as described above, are shown in U.S. Pat. Nos. 3,290,987 and 3,596,253 and in German Pat. No. 1,270,597.

Desirable features of microfilm handling apparatus are rapid access of a desired image frame and precise centering of the image frame in the viewing station.

During the rapid transport of the microfilm web it is desirable that the web motion be accurately controlled to maintain proper tension on the film web so as to prevent any damage thereto, and also to prevent jitter while transporting the web at a slow enough speed for human viewing of individual frames as they move past the viewing station.

Accurate control of web motion is determined by the nature of the power supply system and by the cooperation thereof with the drive motors. In U.S. Pat. No. 3,318,545, which describes a magnetic tape recorder web transport system, there is disclosed a power supply system for furnishing signals to individual supply and takup reel drive motors; which system includes a non-linear voltage divider network having a center tap connected to receive an error signal, and two additional taps, one on each side of the center tap, for furnishing signals to control a capstan drive motor. The supply and takeup reel drive motors are controlled in response to signals produced by sensing the rotational speed of the capstan and also the respective speeds of the web at the supply and takeup reels. Although this combination provides accurate control of web movement it is quite complex and is not ideally suited to a microfilm handling apparatus.

Means for automatically centering an image frame of a film web in a viewing station are described in U.S. Pat. No. 3,184,177. After the predetermined image frame has been located in the vicinity of the viewing station, two photocells adjacent the focal plane and spaced apart by approximately the width of the position marker on the film web, provide position signals in accordance with the amounts of light respectively detected. These position signals are provided to a web position regulation network which causes the supply and takeup reel drive motors to operate until the position signals equalize to indicate that the position marker is centered between the photocells and the image frame is thereby centered in the viewing station.

A limiting feature of the device described in U.S. Pat. No. 3,184,177, is that for a given embodiment thereof, the position markers on all film webs used therewith must all be transparent, or they must all be opaque. The device may be constructed to detect one or the other, but not both interchangeably. Another limitation is that the position markers must all be of the same dimension in the direction of travel of the web on all film webs used therewith.

SUMMARY OF THE INVENTION

In one aspect, the present invention provides accurate motion control in a microfilm handling apparatus by providing a power supply system which includes two controllable sources of potential at taps which are electrically equidistant from a center tap of a non-linear voltage divider network connected between equal positive and negative potential outputs with respect to ground, wherein the center tap is connected to the comparing network for receiving the error signal, and by electrically coupling the two controllable sources of power to the drive motors. Thus, power is differentially applied to the two drive motors in accordance with a single error signal produced by comparing a single web motion signal indicative of the actual web speed and direction with a control signal indicative of desired web transport speed and direction.

In another aspect the present invention provides precise centering of an image frame in the viewing station by providing dual photocells, or equivalent light detection means abut each other and, each have an effective sensing diameter at the focal plane which is not greater than one-half the dimension of a position marker parallel to the direction of travel of the microfilm web, and by providing that the web position regulation network have an automatic centering network coupled to the photocells for comparing the position signals and for producing a signal for stopping the drive motors when this comparison indicates that a position marker is positioned over one photocell and not over the other photocell such that a first edge of the position marker is positioned between the photocells. Thus, when the drive motors are thereby stopped, an image frame is precisely positioned within the viewing station, notwithstanding whether the position marker is transparent or opaque.

The microfilm handling apparatus of the present invention, as described herein, is further characterized by several additional features.

To enable more rapid stopping and starting of the web motion and thereby more rapid access of a desired image frame, the two drive motors are identical low inertia non-hysteresis, printed circuit rotor type D.C. motors. By using such motors having faster response times, the faster response times provided by the solid state circuit means in the various electrical networks of the microfilm handling apparatus can be better realized. Also, by not using iron core motors a time-lag response problem incident thereto is also avoided.

Noise is reduced by directly coupling the drive motors to the spindles upon which the reels are supported.

In order that the position signals produced by the photocells be uniquely indicative of the position markers on the microfilm web, the sensitivity of the photocell circuit is adjusted automatically to any variations in component tolerances ambient conditions or variations in the overall optical density of the film. Accordingly, the web position regulation network includes a position signal conditioning network which is operative when the microfilm handling apparatus is first activated for automatically adjusting the threshold sensitivity level of the photocell circuits in response to circuit and network activation signals produced prior to sensing the initial appearance of the microfilm web at the viewing station.

BRIEF DESCRIPTION OF THE DRAWING

FIGS. 2A and 2B are located on the second sheet of the drawing.

DESCRIPTION OF THE PREFERRED EMBODIMENT

Figure 1:
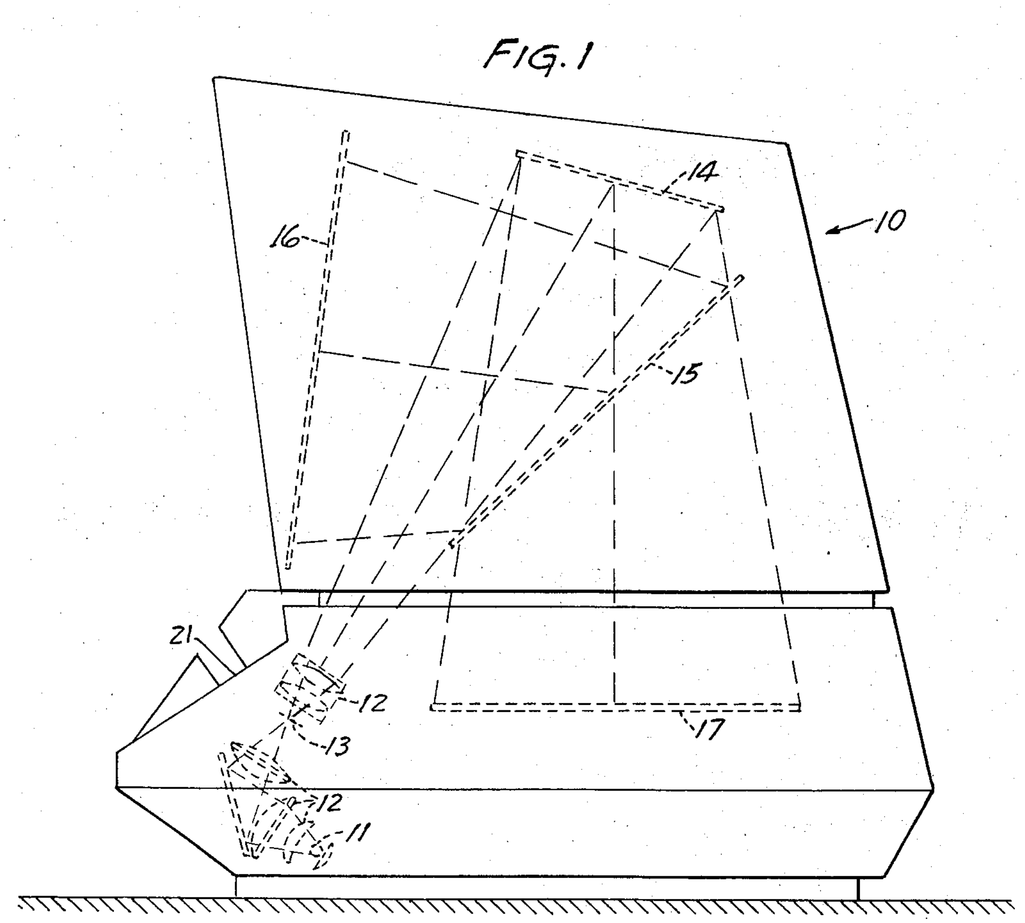
FIG. 1 is a side view of a microfilm web reader/printer apparatus incorporating the present invention, having interior members shown by dotted lines.

FIG. 1 shows a microfilm web reader/printer apparatus 10 incorporating the present invention, wherein light from a light source 11 is condensed and projected by optical elements 12 defining a focal plane 13 at which the microfilm may be positioned. The light image from a microfilm at the focal plane 13 is projected onto a mirror 14 and either reflected therefrom onto a mirror 15, and thence focused onto a viewing screen 16, or reflected onto a copy plane 17 when the mirror 15 is removed from the position as shown between the mirror 14 and the copy plane 17. Light sensitive copying paper may be positioned and exposed at the copy plane 17.

Figure 2A:
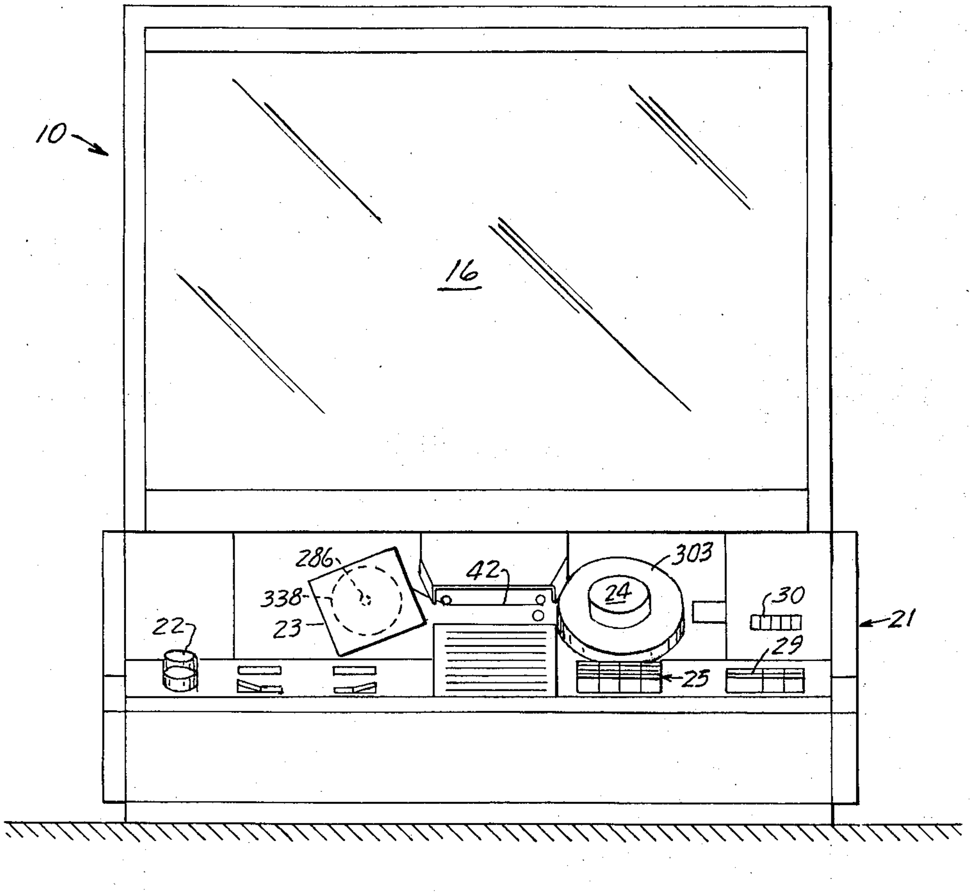
FIG. 2A is a front elevational view of the microfilm apparatus of FIG. 1.
Figure 2B:
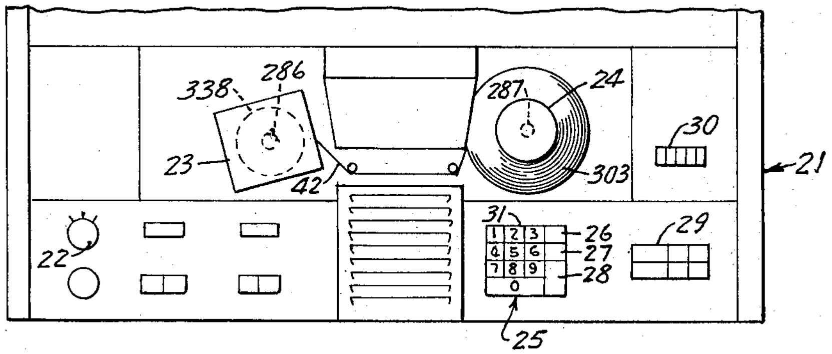
FIG. 2B is a fragmentary elevational view of the control panel thereof.

FIG. 2A is a front view of the projector apparatus 10 showing the viewing screen 16 and a control panel 21. FIG. 2B is a fragmentary elevational view of the control panel 21. A supply reel 338 contained in a cartridge 23 and a takeup reel 303 are supported on spindles 286 and 287 respectively. A manual/film-type selector switch 22 is provided for enabling an operator to adjust the apparatus in accordance with the type of microfilm which is used. If the microfilm web does not have position markers, the switch 22 is placed in a position whereby the operator may manually operate a direction and speed control keyboard 29 to position the desired image frame at the viewing station and a control knob 24 mounted on the spindle 287, to center the located image frame 43 (FIG. 3) in the viewing station. If the microfilm web 42 does have position markers 41 which are compatible with the apparatus of the present invention, then the switch 22 may be placed in eight of two other positions wherein the switching threshold of the photocell circuit may be adjusted in accordance with the type of film which is used; and the desired microfilm frame may be both positioned and centered automatically. One position is for the use of diazo film and the other position is for the use of most other commercially available films, such as silver halide film.

Automatic operation of the apparatus is as follows. A position control keyboard 25 includes 10 frame selection keys 31 numbered "1" to "0" for designating a digital number corresponding to a desired image frame on the microfilm. This keyboard 25 also includes a "clear" key 26, a "reset" key 27, and a "run" key 28. After the digital number of the desired image frame is selected by operation of the frame selection keyboard 31, the "run" key 28 is depressed and the apparatus automatically advances the film to position the selected image frame in the viewing station and automatically centers the located image frame therein. If no digital number is so selected prior to the operation of the keyboard 31, depression of the "run" key 28 causes the film to be rewound into the cartridge 23. The "clear" key 26 may be depressed if the operator desires to change the number which was selected by operation of the frame selection keyboard 31, in which event operation of the apparatus ceases and the selected number is erased. A new number may then be selected. The "reset" key 27 is used when the number of the first image frame of a reel of a microfilm is other than "1;" in which case the appropriate number is entered on the frame selection keyboard 31, and the "reset" key is depressed. The "reset" key 27 may also be used to correct an incorrect count of position markers.

A five-digit display register 30 indicates the number of the image frame last selected by operation of the frame selection keyboard 31.

The direction and speed control keyboard 29 includes keys for enabling manual control of the speed and direction of the film web searching motion when operating the apparatus. The six keys provide for selecting transportion of the microfilm web at high, medium, or low speeds in a forward direction or high, low, or medium speeds in a reverse direction.

Figures 3, 4:
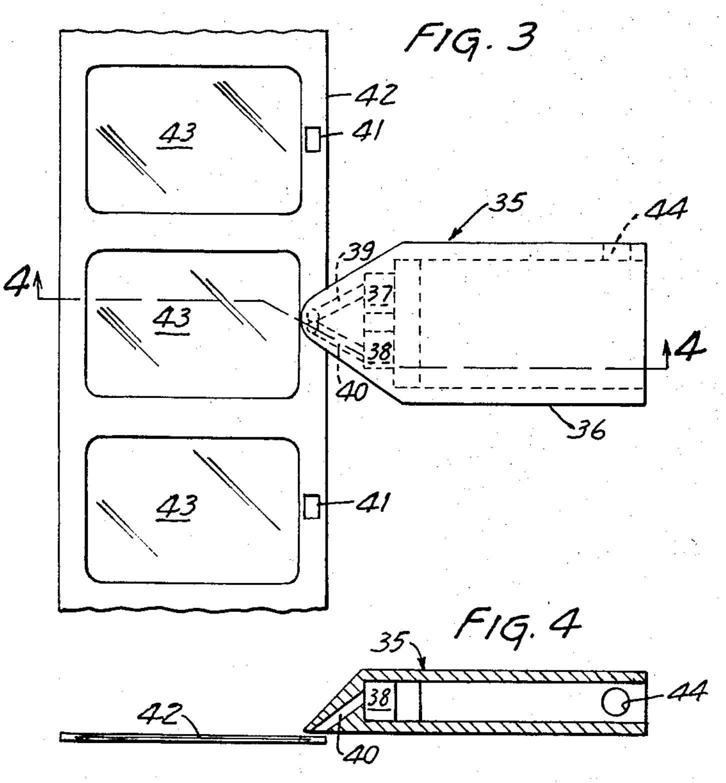
FIG. 3 is a fragmentary detail view of the light detection means positioned in cooperation with a section of a microfilm web for detecting position markers on the web.
FIG. 4 is a cross-sectional view of the detection means and microfilm web of FIG. 3 taken approximately along the section line 4—4.

As shown in FIG. 3, the viewing station includes a light detection means 35 comprising a housing 36 having two parallel chambers within which are located two photocells, phototransistors 37 and 38. The light sensitive surfaces of the phototransistors 37 and 38, or dual light detectors, are directed inward via light pipes 39 and 40, such that the total effective light sensitive area of the combined phototransistors 37 and 38 is that of the exposed end of the light pipes 39 and 40, and is substantially the same size as a position marker 41 on a microfilm 42. The light detection means 35 is positioned so as not to obstruct light passing through the image frames 43 onto the mirror 14, but does allow light from the light source 11 to pass through the position markers 41 and impinge on the light pipes 39 and 40. Leads for connection to the phototransistors 37 and 38 may be inserted through a port 44. The light detector means 35 may also be positioned together with means providing lateral and transverse motion of the light detector 35, thereby enabling the light detector to be precisely positioned with respect to position markers differing in polarity and in relative positions within the web 42.

In FIG. 4, one light pipe 40 is shown in section to better show the placement thereof with respect to a position marker 41 such that light sensed upon the presence of the position marker 41 is passed to the light sensitive surface of the phototransistor 38.

Figure 5A:
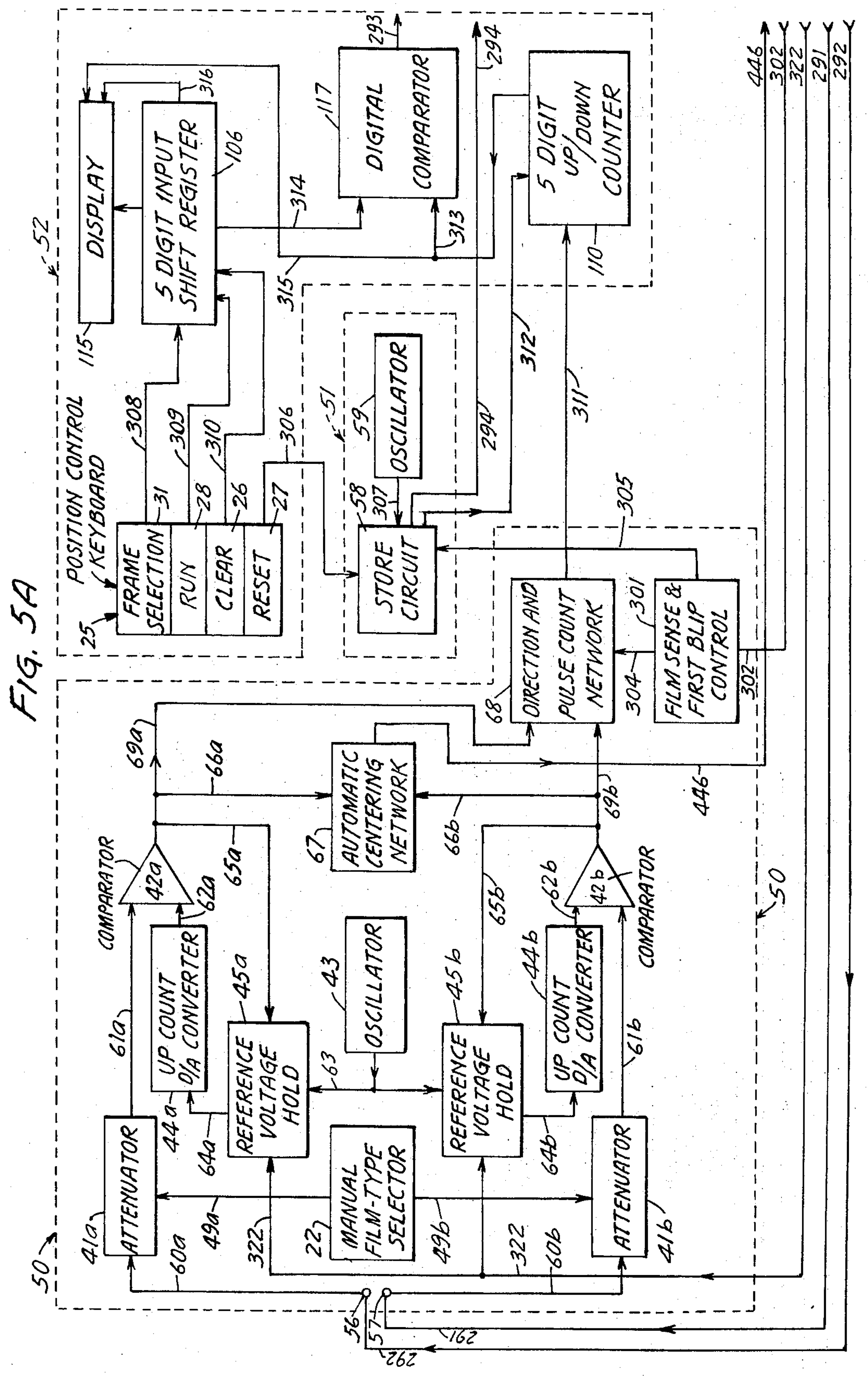
FIGS. 5A and 5B, appearing on two separate sheets of drawing respectively, together show a schematic diagram, partially in block form, of a preferred embodiment of the microfilm handling apparatus of the present invention.
Figure 5B:
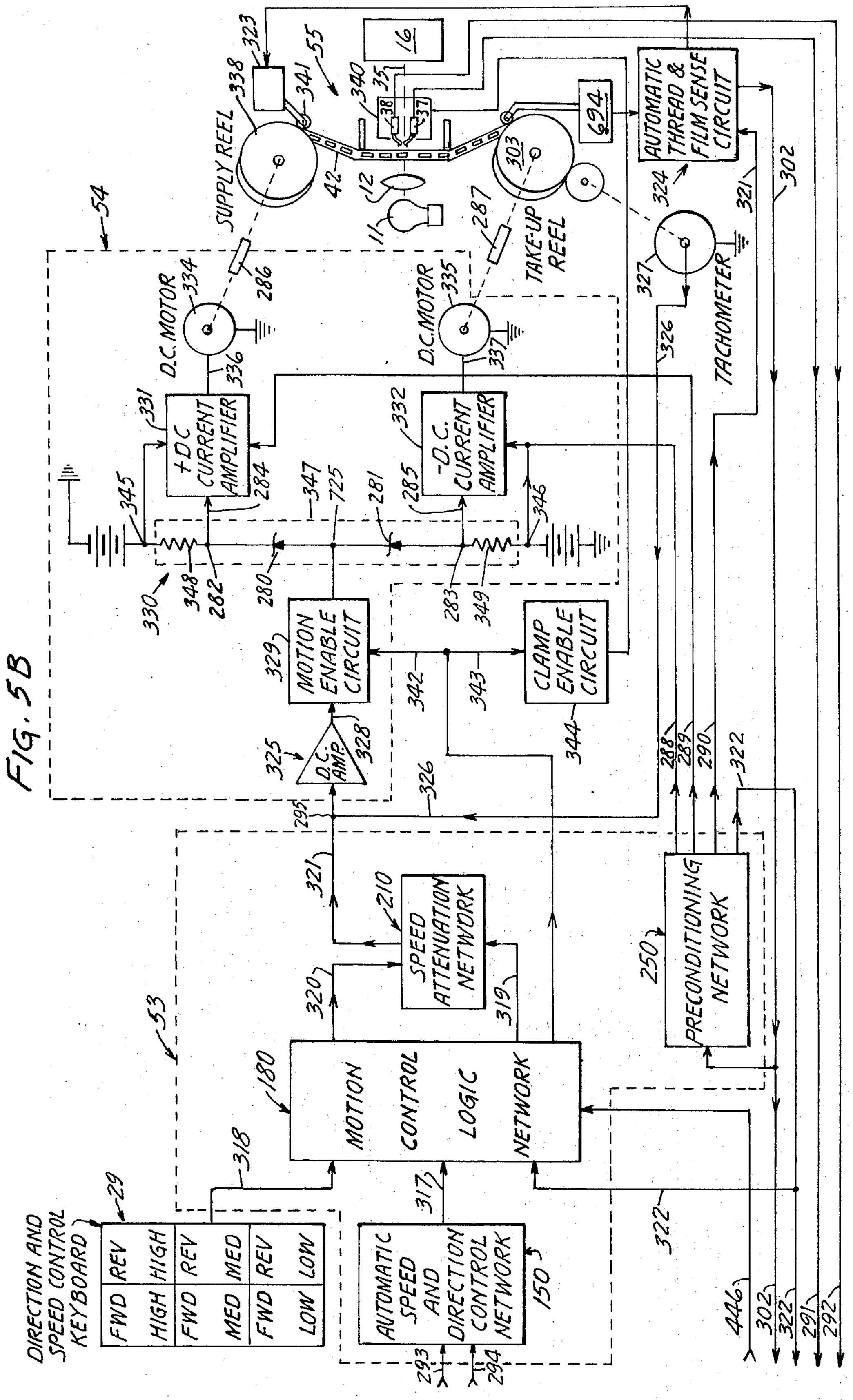

The combination of FIGS. 5A and 5B is a schematic diagram, partially in block diagram form, of a preferred embodiment of the film handling apparatus of the present invention.

Microfilm supporting and projection mechanisms 55 are shown schematically in FIG. 5B. A supply reel 338 and a takeup reel 303 are supported on spindles 286 and 287 respectively and are positioned to support a microfilm web 42 in a transport path past a viewing station 340. Dual drive motors 334 and 335 are directly coupled to the spindles 286 and 287 for controllably driving the supply takeup reels 338 and 303. The drive motors 334 and 335 are included in a transport drive network 54.

The control system, or web position regulation network, is included within a position signal conditioning network 50, a memory reset network 51, digital input and comparison network 52, and motion control network 53.

The actual transport speed and direction of the microfilm web are sensed by a tachometer 327 which provides a web motion signal on a lead 326. The comparing means, node 295, compares the control signal on lead 321 and the web motion signal on lead 326. The D.C. amplifier 325 amplifies the resultant of these two signals to provide the error signal on lead 328 indicative of the difference between the two compared signals. The error signal is fed through a motion enable circuit 329 to the center tap 725 of a non-linear voltage divider network 347 included within a power supply system 330. The power supply system 330 is coupled to the drive motors 334 and 335 through D.C. current amplifiers 331 and 332 respectively, to produce web motion in accordance with the error signal. The power supply system includes output terminals 345 and 346 where there are provided equal positive and negative electrical potential outputs with respect to ground. The non-linear voltage divider network 347 is electrically connected between the positive and negative electrical potential output terminals 345 and 346 and has two additional taps 282 and 283 which are located electrically equidistant from the center tap 725 for providing two controllable sources of power, the absolute potentials of the additional taps 282 and 283 being equal with respect to the center tap, but having opposite polarities with respect to the center tap 725. The additional taps 282 and 283 are thereby connected to track the error signal on the lead 328 and to increase and decrease in accordance with increases and decreases in the error signal. The supply reel drive motor 334 is electrically coupled between ground and the additional tap 282 and the takeup reel drive motor 335 is electrically coupled between ground and the other of the additional taps 283 to cause power to be differentially applied to each drive motor 334, 335 in accordance with the error signal.

The position signal conditioning network 50 includes two input terminals 56 and 57 to which position signals provided from the phototransistors 37 and 38 are coupled via leads 291 and 292 respectively and contains separate networks for processing each signal. The position signals applied at the terminals 56 and 57 are coupled via leads 60*a* and 60*b* through attenuator networks 41*a* and 41*b* and leads 61*a* and 61*b* to comparator networks 42*a* and 42*b* respectively. The attenuator networks 41*a* and 41*b* are controlled by the manual/film-type selector switch 22, located on the control panel 21, and coupled to the attenuator networks via leads 49*a* and 49*b*, respectively.

The switching threshold of the photocell circuits are automatically adjusted as follows. A local oscillator 43 provides a series of pulses via lead 63 to reference voltage hold networks 45*a* and 45*b* and via leads 64*a* and 64*b* to up-count digital-to-analog converter networks 44*a* and 44*b*, thereby generating ramp signals which are applied to comparator networks 42*a* and 42*b* on leads 62*a* and 62*b* respectively. Each position signal, after passing through the attenuator networks 41*a* and 41*b* is compared by the comparator networks 42*a* and 42*b* with a ramp signal from the up-count digital-to-analog converter networks 44*a* and 44*b* such that when the ramp signal on leads 62*a* and 62*b* equals or slightly exceeds the position signal on leads 61*a* and 61*b*, the comparator network 42*a* or 42*b* switches to a second state thereby providing a switching signal on the lead 65*a* or 65*b* to the coupled reference hold network 45*a* or 45*b*. Each reference hold network 45*a*, 45*b* includes an up-count control network shown in FIG. 6, which decouples the oscillator 43 from the up-count digital-to-analog converter 44*a*, 44*b* upon receipt of the switching signal from the comparator 42*a*, 42*b*. The decoupling of the oscillator 43 causes the up-count digital-to-analog converters 44*a* and 44*b* to remain fixed at a constant reference level thereby providing each comparator 42*a* and 42*b* with a constant reference level against which subsequent changes in the output of each phototransistor 37 and 38 are compared and unequivocably recognized as having been produced by the presence of position markers 41. The outputs of the comparator networks 42*a* and 42*b* are also connected via leads 66*a* and 66*b* to the automatic centering network 67 and via leads 69*a* and 69*b* to the direction and pulse count network 68.

Figure 6:
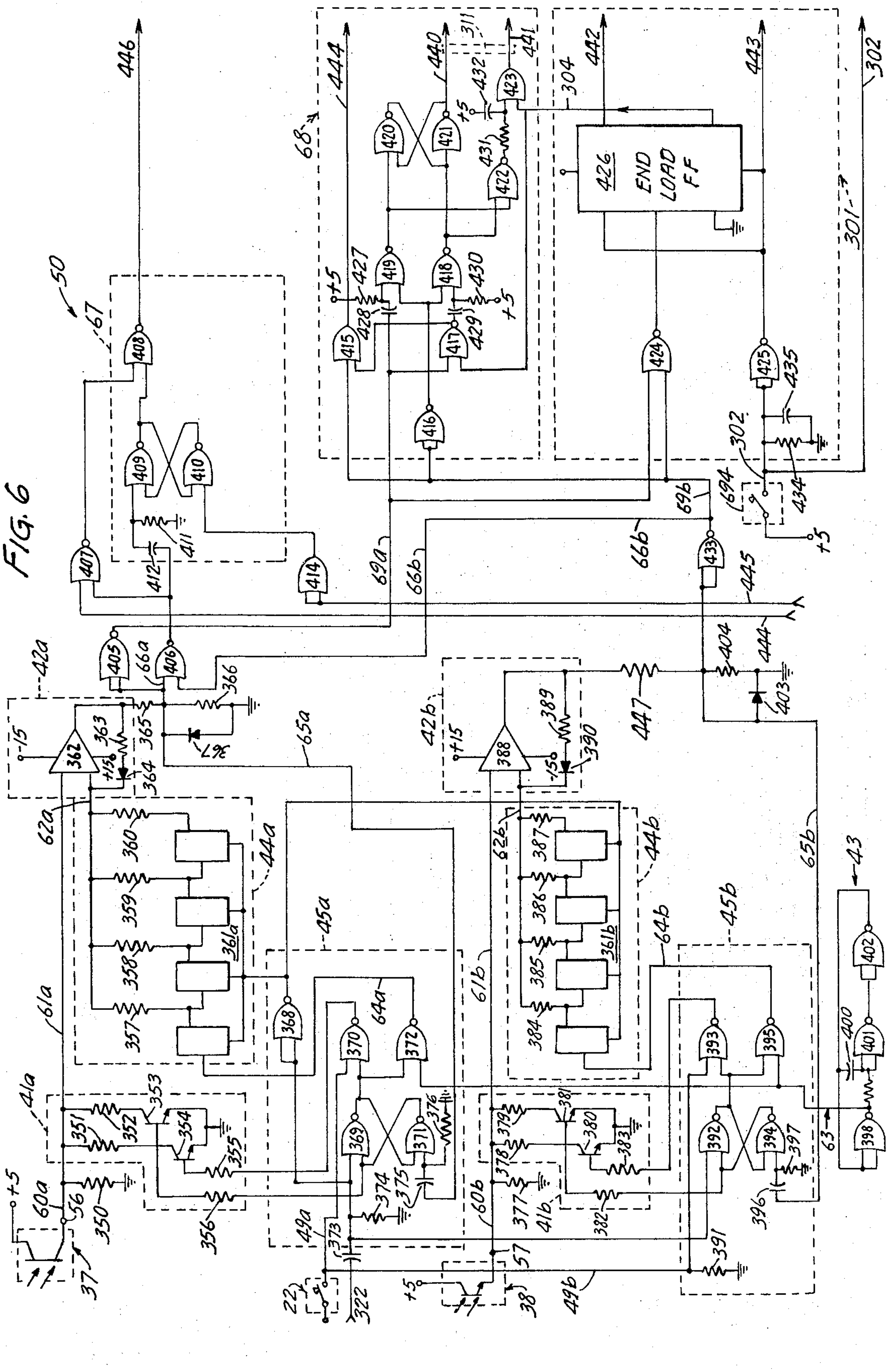
FIG. 6 is a schematic circuit diagram of the position signal conditioning network shown in FIG. 5A and identified therein by reference numeral 50.

The direction and pulse counting network 68 provides separate signals on leads 311 which are indicative of the direction of microfilm motion and of the occurrence of each position marker. A film sense and first blip control network 301 is controlled by a film sense signal on lead 302 provided by a sensing switch 694 located adjacent the microfilm takeup reel 303. The initial presence of microfilm on the takeup reel 303 energizes the switch and causes the film sense and first blip control network 301 to produce activation and energization signals on leads 304 and 305 to the direction and pulse count network 68 and to a store circuit 58 respectively. Additional details of the position signal conditioning network 50 are shown in FIG. 6.

Figure 7:
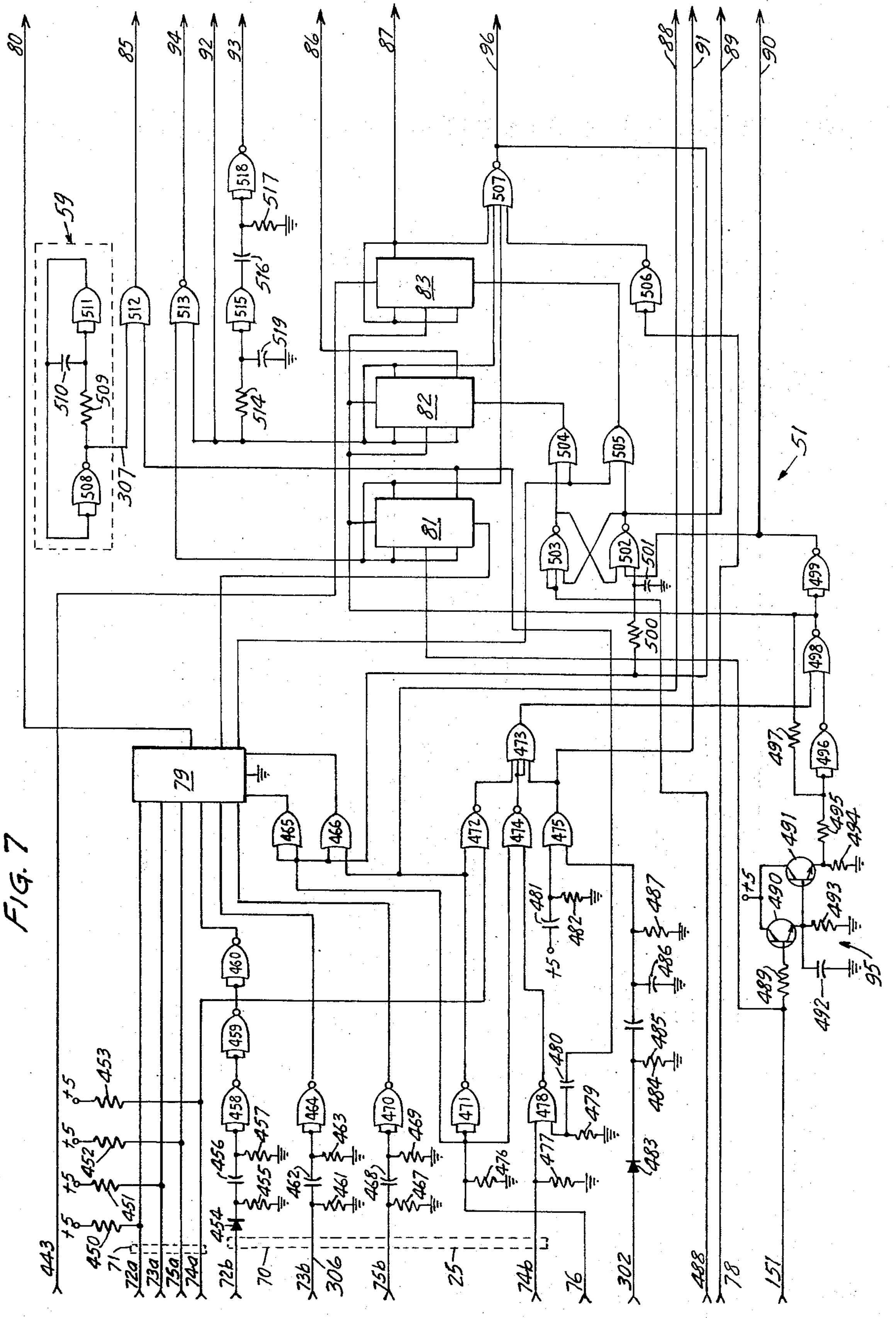
FIG. 7 is a schematic diagram of the memory reset network shown in FIG. 5A and identified therein by the reference numeral 51.

The memory reset network 51 comprises the store circuit 58 and an oscillator circuit 59 interconnected to the store circuit 58 via lead 307. This network 51 is responsive to reset command signals from the reset key 27 via lead 306. The details of network 51 are shown in FIG. 7.

Figure 8:
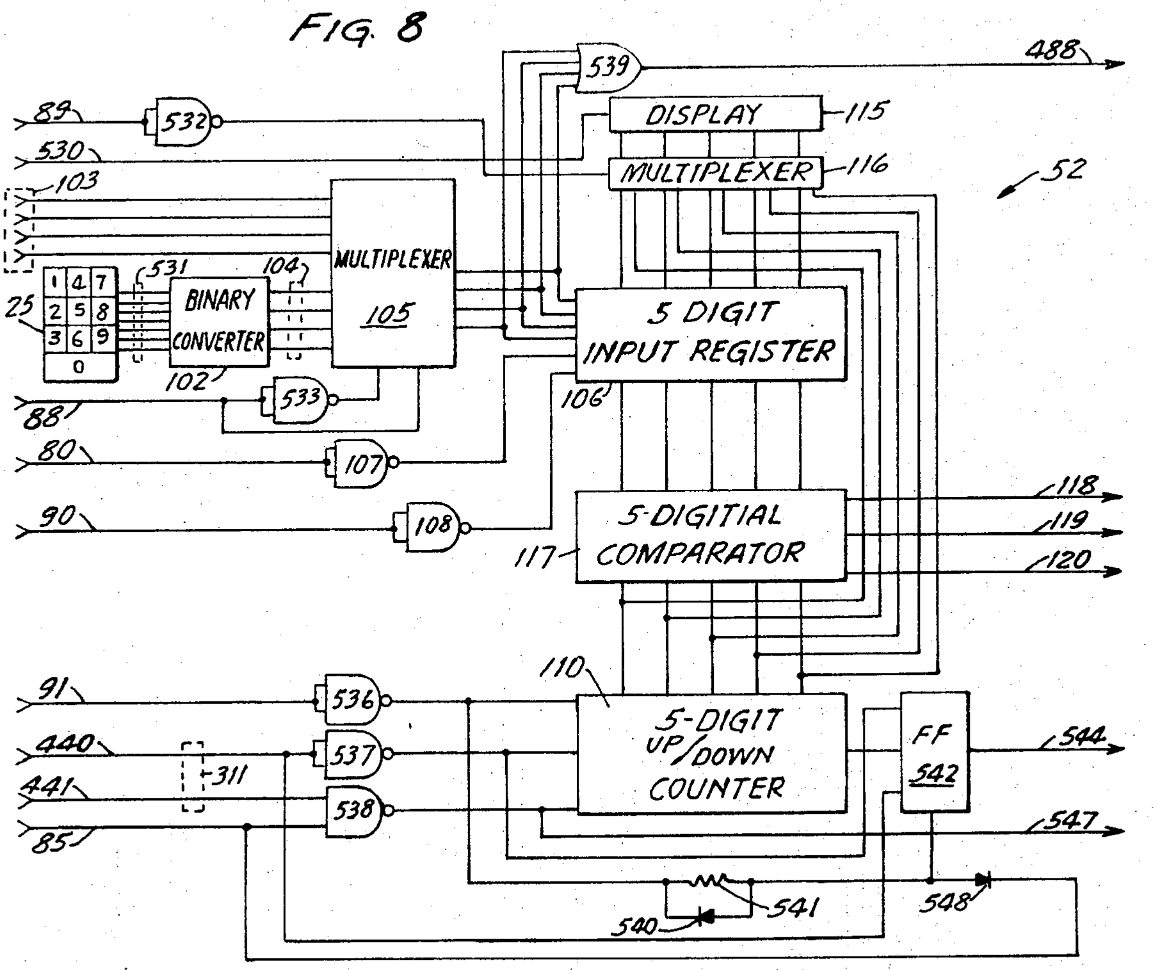
FIG. 8 is a schematic diagram of the digital input and comparison network shown in FIG. 5A and identified therein by the reference numeral 52.

The digital input and comparison network 52 which is shown in detail in FIG. 8, is shown in FIG. 5A to generally include the position control keyboard 25, a five-digit input shift register 106 coupled to the keyboard 25 via leads 308, 309 and 310, a five-digit up/down counter 110 connected to the direction and pulse count network 68 by the leads 311 and connected to the memory reset network 51 via lead 312, a five-digit, digital comparator network 117 connected to the five-digit up/down counter 110 via a lead 313 and to the five-digit input shift register 106 by lead 314, and a display network 115 containing the five-digit display register 30 (FIG. 2). The output signals from the direction and pulse count network 68 are applied to the five-digit up/down counter 110 on the leads 311 whereby a total count of the number of position markers is produced. Desired microfilm image frame positions are inserted by operating the frame selection keyboard 31 and digital signals indicative thereof are coupled to the five-digit input shift register 106 via the lead 308. The total count in the up/down counter 110 is compared with the number entered in the input shift register 106 by means of the digital comparator 117, the output of which is provided on a lead 293. A visual display of the count registered in counter 110 or of the number entered in the shift register 106 is provided by display device 115, which is coupled to the counter 110 via lead 315 and to the shift register 106 via lead 316.

Figure 9:
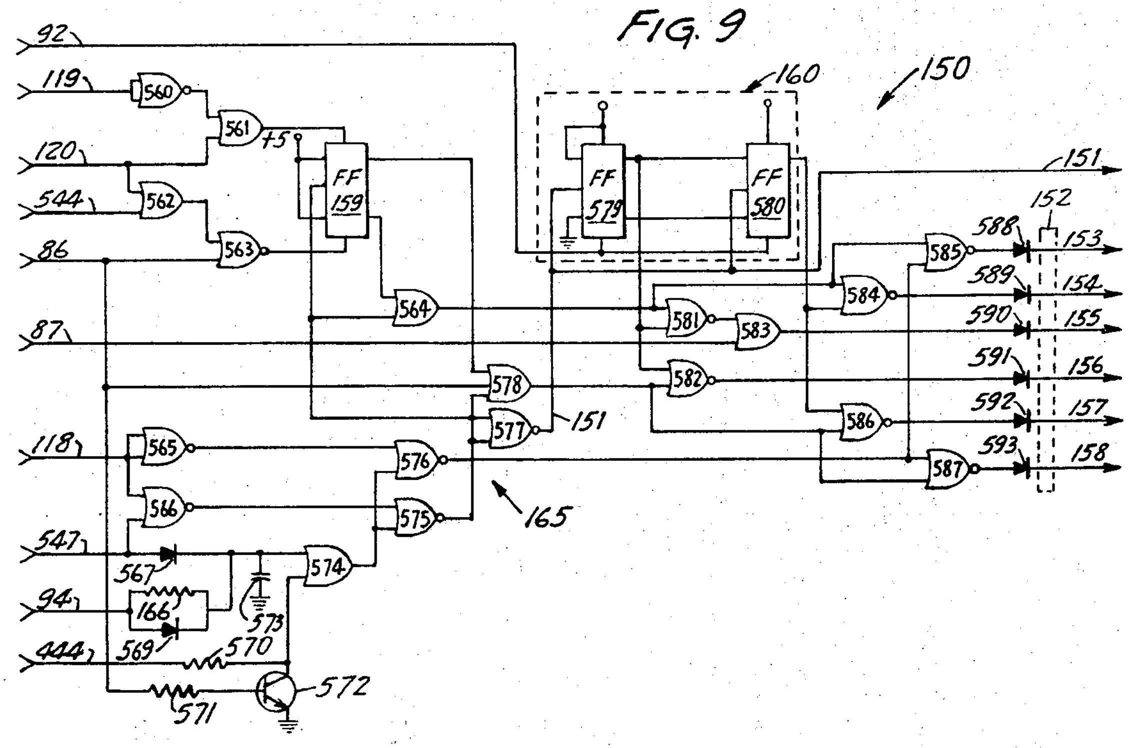
FIG. 9 is a schematic diagram of the automatic speed and direction control network shown in FIG. 5B and identified therein by the reference numeral 150.
Figure 10:
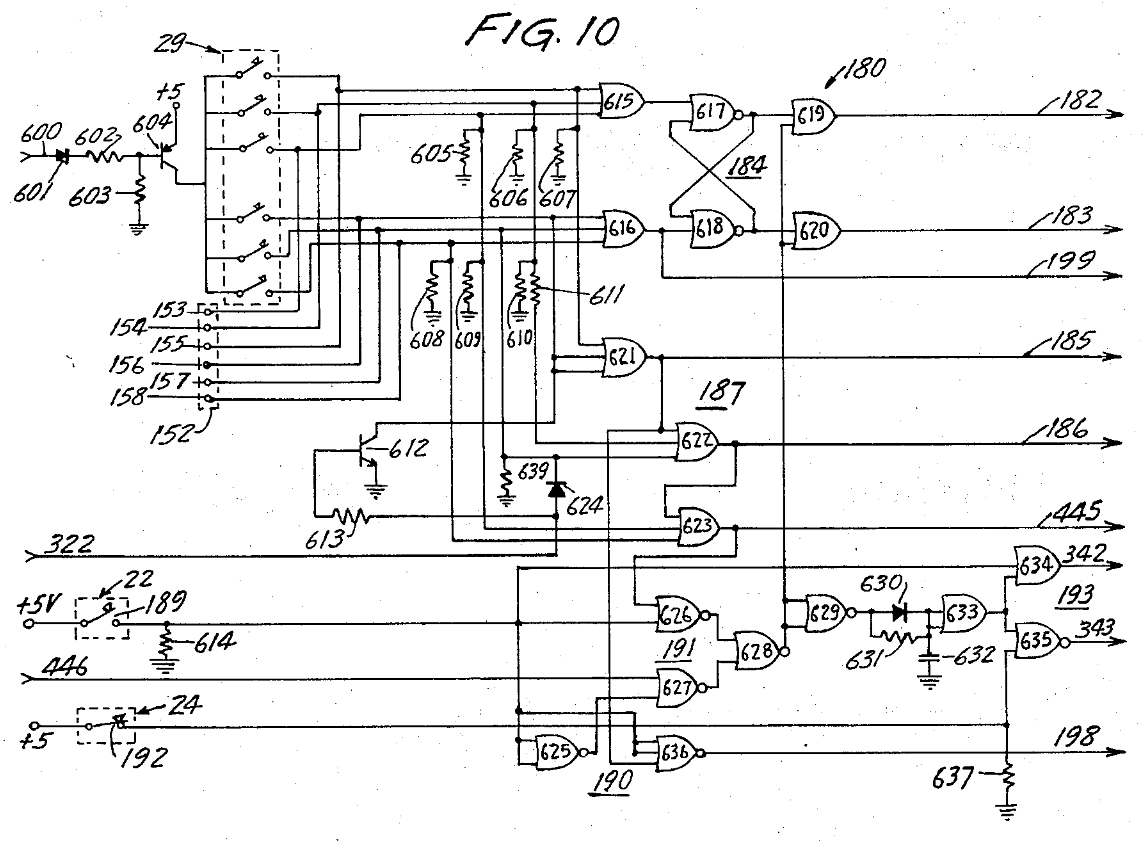
FIG. 10 is a schematic diagram of the motion control logic network shown in FIG. 5B and identified therein by the reference numeral 180.
Figure 11:
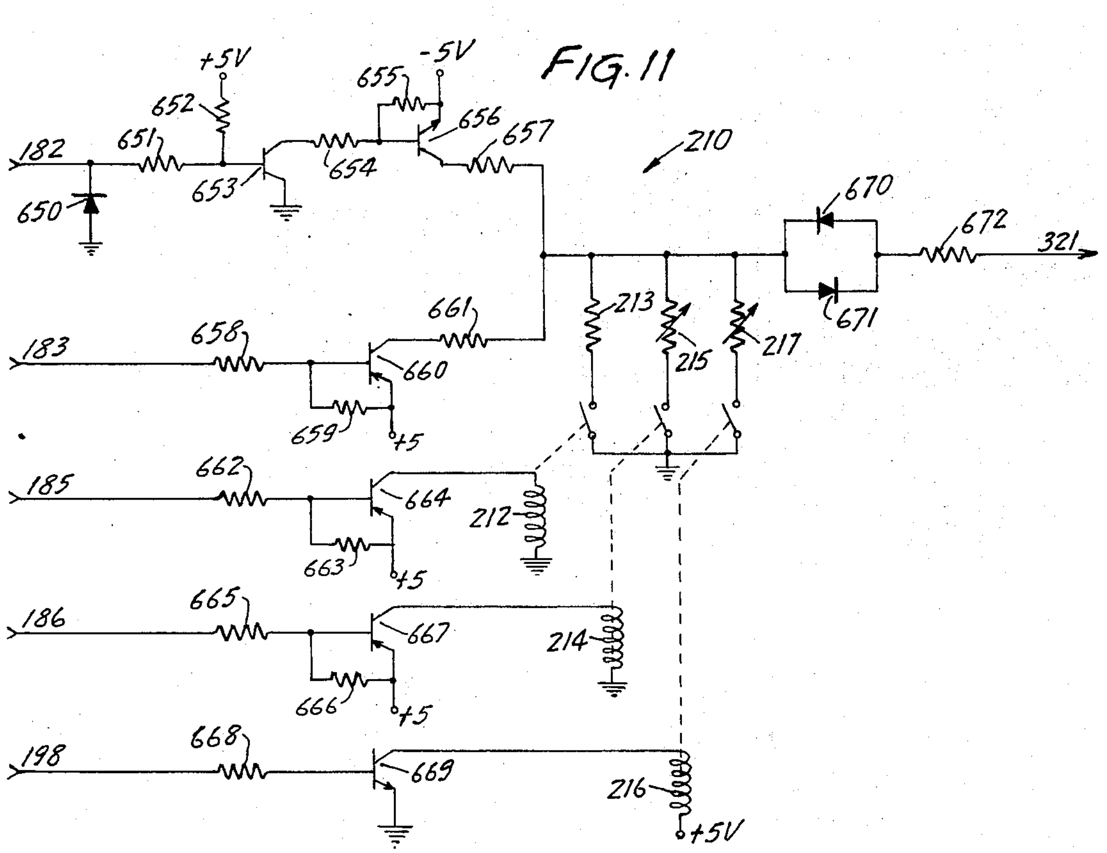
FIG. 11 is a schematic diagram of the speed attenuation network shown in FIG. 5B and identified therein by the reference numeral 210.
Figure 12:
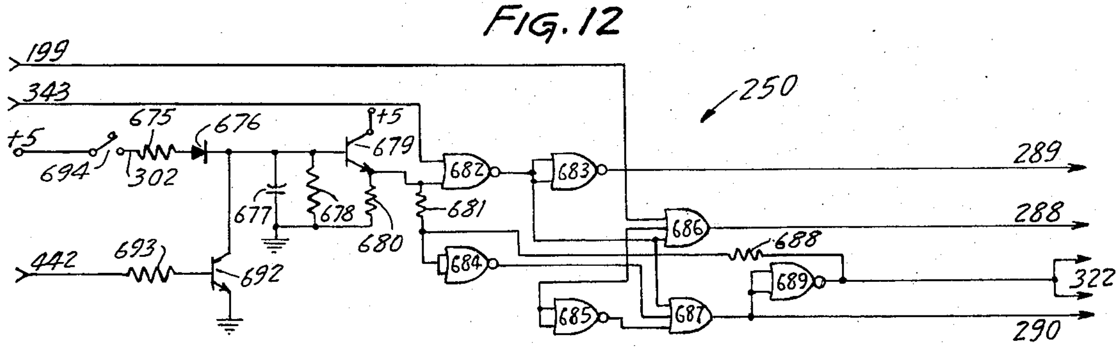
FIG. 12 is a schematic diagram of the preconditioning network shown in FIG. 5B and identified therein by the reference numeral 250.

The motion control network 53 (FIG. 5*b*) is shown to generally include an automatic speed and direction control network 150, shown in detail in FIG. 9; a motion control logic network 180 shown in detail on FIG. 10; a speed attenuation network 210, shown in detail on FIG. 11; and a preconditioning network 250 shown in detail on FIG. 12. The output signals from the digital comparator network 117 are coupled via lead 293 to the automatic speed and direction control network 150. Additional control signals are provided to the control network 150 from the store circuit 58 via lead 294. The signals from the comparator 117 on the lead 293 are indicative of whether the "blip" count representing the present microfilm position is greater, less than, or equal to the "blip" count representing the desired microfilm position. These signals are converted by the automatic speed and direction control network 150 into a set of direction and speed command signals, which in turn are coupled to the motion control logic network 180 via lead 317. The direction and speed control keyboard 29 provides for manual control of speed and direction. Signals therefrom are also coupled to the motion control logic network 180 via lead 318 for subsequent processing. The motion control logic network 180 operates to produce modified direction command signals on lead 320 and high, medium and low speed attenuator control signals on a lead 319. Both types of signals are coupled to the speed attenuation network 210 via the leads 319 and 320, whereupon the direction signals from the motion control logic network 180 are selectively attenuated to produce a primary reference control signal on lead 321. The preconditioning network 250 is controlled by the film sense signal on lead 302 produced by a film sense switch mechanism 694. The preconditioning network 250 provides motion enabling signals on leads 288 and 289. The presence of a film sense signal also causes the production of load command signals on leads 290 and 322, the first of which actuates the automatic threading mechanism 323, via the automatic thread and film sense circuit 324. The load signal on lead 322 is coupled back to the reference voltage hold networks 45*a* and 45*b* to initiate the automatic photocell switching threshold adjustment.

Referring to the transport driving network 54, the motion enabling circuit 329 is energized by a motion enable signal from the motion control logic network 180 via lead 342. An additional signal from the motion control logic network 180 is coupled via lead 343 to the clamp enabling circuit 344 which, when energized, engages a film clamp mechanism (not shown) within the viewing station 340 so that the microfilm web is accurately positioned in the focal plane 13. The voltage divider network 347 comprises a four element series circuit connected between the power source terminals 345 and 346, having a pair of equal resistance resistors 348 and 349, and zener diodes 280 and 281.

Referring to the microfilm supporting and projection mechanism 55, the light source 11 and optics system 12 are shown schematically as projecting an image of an image frame onto viewing screen 16. The automatic threading mechanism 323 includes as a drive-out means, a driven member 341 which is actuated by the automatic thread circuit 324, in response to a signal on lead 321. Upon actuation, the member 341 is driven towards the hub of the supply reel 338 and forces a leading edge of the microfilm web out of the cartridge 23 through the transport path and onto the takeup reel 303, where it becomes engaged by subsequent layers of the web.

Detailed descriptions of the circuits and networks contained within the various sections discussed hereabove are set forth in the following descriptions of the additional figures.

FIG. 6 sets forth in detail the circuit and logic networks utilized in conditioning the position signals produced at the outputs of the dual light detectors, phototransistors 37 and 38. The outputs are both conditioned in the following identical manner. In order that the position signals be uniquely identified with the appearance of position markers, it is preferable that the base line and threshold condition is separately determined for each reel of microfilm inserted in the apparatus. This is necessary in that the overall optical density sometimes varies from reel to reel. This separate determination is provided in a preferred embodiment of the present invention by the use of a comparator network 42*a*, 42*b* which balances the phototransistor 37,38 outputs in the absence of a microfilm web 42 against a ramp signal until the comparator is caused to change states, at which point the ramp is disconnected and remains fixed at that point. As shown in FIG. 6, a preferred means for providing the ramp signal is by a system including the oscillator 43 which provides a series of pulses on lead 63 through the reference voltage hold network 45*a*, 45*b* to the up-count digital-to-analog converter 44*a*, 44*b*, to provide a ramp signal on the lead 62*a*, 62*b* to the comparator 42*a*, 42*b*. Such a system thereby provides a fixed output upon termination of the oscillator input signal to the up-count digital-to-analog converter 44, and does not allow the threshold value to change with the passage of time. Upon receipt of a load signal via lead 322 and reference voltage hold network 45*a*, 45*b*, the up-count digital-to-analog converter 44*a*, 44*b* is cleared, thereby enabling a new threshold level to be established. The outputs of the comparators 42*a*, 42*b* are coupled back to the reference voltage hold network 45*a*, 45*b* to deactivate the oscillator 43 upon the comparator 42*a*, 42*b* changing state. The outputs of the comparators 42*a*, 42*b* also provide conditioned position signals which are combined and fed through a NOR gate 406 to an automatic centering network 67. This network insures that the automatic centering function is only activated when certain prescribed conditions exist. The outputs of the comparators 42*a*, 42*b* are also coupled to a direction and pulse count network 68 which provides the basic "up/down" and "blip" count signals on leads 440 and 441 respectively. The comparator 42*a*, 42*b* outputs are further coupled to a film sense and first blip control network 301, via a NOR gate 424, the output of which controls an end load flip-flop 426. The-end load flip-flop 426 is additionally controlled by the presence of a film sense signal produced on the lead 302 and provides an output coupled via a lead 304 to NAND gate 423 in order to initiate the "blip" count signal output 441. An activation signal indicative of the termination of complete loading operations is also provided by the end load flip-flop 426 at lead 442. Detailed descriptions of additional portions of the logic networks comprising the position signal conditioning network 50 are set forth below.

In a preferred embodiment, the light detectors are silicon phototransistors 37, 38 such as manufactured by Motorola Corporation, Model MRD 150. The outputs of the phototransistors 37 and 38 are coupled to the comparator networks 42*a* and 42*b* through the attenuator networks 41 and 41*a*. The attenuator networks are essentially parallel resistors 350, 351 and 352, and 377, 378 and 379 respectively. Each of the resistors 351, 352, 378, 379 is subject to being selectively connected to ground via switching circuits comprising switching transistors 353 and 354, and 380 and 381 respectively. The appropriate transistor is switched into a conducting state by means of a control voltage applied thereto from the attenuator control logic gates 370 and 393 respectively, located within the reference voltage hold networks 45*a* and 45*b*. The attenuation networks 41*a*, 41*b* satisfy a need to conveniently provide for the use of a variety of types of microfilm in the apparatus of the present invention. Microfilms in common usage include those having a silver halide emulsion layer and those having a diazo or other organic compound layer. These basic two types of microfilm differ appreciably in their transmissivity to infrared light, to which the phototransistors 37, 38 are primarily sensitive. This difference in transmissivity would cause gross differences in the output level of the phototransistors 37, 38 when the two types of films are interchangeably used; and sensing circuits designed to sense a change in the output produced by a position marker present in one type film will usually be unable to reliably sense position markers present in another type film. Thus, it has been found desirable to provide a switch which may be positioned to adjust the sensing circuits depending upon which type of film is used. Positioning of the manual/-film-type selector switch 22 for using diazo film, applies a 5 volt signal to the attenuator network NOR gates 370 and 393 which causes a separate attenuation circuit to be actuated.

The appropriately attenuated phototransistors 37, 38 output position signals are applied to the comparator networks 42*a* and 42*b* via the leads 61*a*, 61*b*. These networks 42*a*, 42*b* comprise operational amplifiers 362 and 388 respectively, each of which has dual inputs, the second input being connected via lead 62*a*, 62*b* to the output of the up-count digital-to-analog converter network 44*a* and 44*b*. This up-count network 44*a*, 44*b* is in turn supplied with a series of pulses originating within the oscillator 43. The oscillator 43 may be of any conventional design for generating a train of digital pulses, such as, for example the series of NOR gates 398, 401 and 402, having a feedback loop connecting the output of gate 402 with the input of the gate 398. An output signal from the oscillator 43 is applied to the up-count digital-to-analog converter 44*a*, 44*b* via NOR gates 372 and 395. A further input to the up-count control networks 45*a* and 45*b* is provided at lead 322 wherein a load signal is sent back from the preconditioning network 250 which load signal is indicative of the initial presence of a film within the takeup reel 303.

It is desirable to reset the switching threshold level of comparators 42*a*, 42*b* whenever a new reel of micofilm is inserted, due to the aforementioned differences between general types of microfilm and further, due to differences in the optical densities of a given type of microfilm. The threshold reset function is actuated via NOR gate 368, the output of which resets the up-count digital-to-analog converters 44*a* and 44*b* and by the NOR gates 369 and 371, and 392 and 394 respectively, connected in a bistable mode to open the NOR gates 372 and 395 respectively whereby the output of the oscillator is allowed to provide the series of pulses to the up-count digital-to-analog converters 44*a* and 44*b*. Upon receipt of a load signal and before position signals begin to occur, the rising voltage level on the lead 62*a*, 62*b* is compared with the attenuated position signals in the comparator networks 42*a* and 42*b*, and when the voltage level on the lead 62*a*, 62*b* becomes equal or slightly greater than the voltage level on the lead 61*a*, 61 *b*, the comparator 42*a*, 42*b* changes state. This change is fed back via capacitors 375 and 396 to the NOR gates 371 and 394 respectively, whereby the bistable connected gates 369 and 371, and 392 and 394 respectively, are caused to change states and thereby decouple the oscillator 43 from the up-count digital-to-analog converter 44*a*, 44*b*. This causes the count in the digital-to-analog converters 44*a*, 44*b* to remain fixed, thereby maintaining a constant reference voltage from which subsequent changes in the amplitude of the position signals on the lead 61*a*, 61*b* are unambiguously identified as being produced by the presence of position markers on the microfilm.

The outputs of the comparators 42*a* and 42*b* are combined via the NOR gate 406, the output of which is used in conjunction with an additional input signal on a lead 444 to control the activation of the automatic centering network 67 via NOR gate 407. The additional signal is a portion of a film clamp enabling signal, provided on lead 444, which is supplied whenever the film clamp is released, thereby allowing film motion to occur. Another input to the automatic centering network 67 is provided on lead 445, wherein the absence of a signal indicative of low speed web transport motion allows the production of the automatic centering output signal on a lead 446. The outputs of comparators 42*a* and 42*b* are also coupled via NOR gates 405 and 433 respectively to the direction and pulse count network 68. This network 68 recognizes the sequence of occurrence of pulses from the phototransistors 37 and 38 and thereby provides an up-down signal on the lead 440, indicative of the direction of travel of the microfilm. An additional output is provided on the lead 441 as an indication of the occurrence of position markers 41. The film sense and first blip control network 301 is also controlled by inputs from the NOR gates 405 and 433 together with a signal from the film sensing switch 694 via the lead 302. The presence of a film within the takeup reel 303 causes the switch to be opened, thereby providing a 5 volt signal to the end load flip-flop network 426, causing the flip-flop 426 to change states and provide an end of the load signal on lead 442, which in turn activates other networks within the apparatus 10. The other output of the flip-flop 426 is coupled to the direction and pulse count network via lead 304 to enable the "blip count" signals to commence, thereby providing a means wherein an initial blip count produced by the leading edge of the microfilm is not counted as the occurrence of a position marker.

FIG. 7 sets forth the detailed logic networks included within the memory reset network 51. These networks produce machine function commands in response to either local or remote input signals, and provide signals to reset the total count registered in the five-digit up/down counter 110 in response to appropriate inputs. FIG. 7 shows two general sets of input leads, 70 and 71, one set 70 from a machine keyboard 25 and one set 71 from a remote terminal respectively. Parallel inputs include clock driving signals on leads 72*a* and 72*b* to indicate the presence of valid signal inputs; "reset" signals on leads 73*a* and 73*b* to initiate the memory update function; "clear" signals on leads 74*a* and 74*b* to clear the input register, and "run" signals on leads 75*a* and 75*b* to initiate transport motion. Other inputs include a remote select signal on lead 76, the film sense signal on lead 302, and a signal on lead 78, which is indicative of the presence of microfilm containing position markers which signal on lead 78 is produced when the switch 22 is switched to either the silver or diazo film positions.

Signals from the local and remote leads 70 and 71 are switched via a multiplexer 79, which is activated by a signal on the remote lead 76. The outputs from the multiplexer 79 provide a shift register signal on a lead 80 and input signals to store, search and rewind flip-flop circuits 81, 82 and 83 respectively. One output lead of the store flip-flop 81 is combined with the output lead of a local oscillator 84 to provide a store count output signal on a lead 85, which enables a number provided by the position control keyboard 25 to be transferred to the up/down counter 110. The search and rewind flip-flop circuits 82 and 83 are selectively activated by keyboard position command signals registered prior to initiation of a "run" command signal on lead 73*a*, 73*b*. In the event a position command signal has been registered, the search flip-flop circuit 82 provides an output signal on lead 86 to enable the automatic direction and motion control circuit 150 to initiate web transport motion. In an opposite state, the search flip-flop 82 provides a clear speed change signal on a lead 92, a display protect signal on lead 93, and combines with an output from the store flip-flop 81 to provide a store or search signal on lead 94. In the event no position command signal has been received, the rewind flip-flop circuit 83 provides an output signal on lead 87 to enable high speed reverse web transport motion. Also shown as output signals on FIG. 7, are a remote switch signal on a lead 88, which activates a multiplexer 105, a key data flip-flop signal on lead 89, which activates the display multiplexer 116, clear signals on leads 90 and 91, to clear the five-digit input shift register 106 and the five-digit up/down counter 110, respectively, and a print ready signal on lead 96 to enable a print function. A second display (not shown) may be provided which when enabled by the display protect signal on lead 93 will record the frame number viewed prior to the last search initiation. Similar clear function signals are provided on a lead 92 to clear the speed change network 160 upon initial energization of the apparatus 10, in response to the presence of an end of load signal on lead 443 and by the presence of an input "equal" signal on lead 151, indicative of the completion of a normal search or update function.

FIG. 8 sets forth the functional circuits included in the digital input and comparison network 52, by which information indicative of a desired web position or image frame is compared with information indicative of the actual web position to provide transport motion signals. The desired position signals are coupled via leads 531 provided from a ten-position keyboard switch 25 to a binary encoder 102 which translates the signals into a four-bit binary number. Similar information may be received from remote inputs via leads 103 from a remotely located control panel (not shown). Selection between the remote inputs on leads 103 and the local inputs on leads 104 is provided by a multiplexer switch 105, activated by a remote signal on a lead 88, provided from the memory reset network 51, discussed in relation to FIG. 7. The outputs of the multiplexer 105 are applied to a five-digit input register 106 which is controlled by shift and clear signals on leads 80 and 90 respectively, also supplied from the memory reset network 51 through NOR gates 107 and 108. The five-digit input register 106 comprises a bank of five four-bit registers (not shown) coupled to form a parallel shift register. In a preferred embodiment each four-bit register may, for example, be a register such as that produced by Texas Instruments, Inc. part No. SN 74175.

Indication of actual web position, e.g., the specific image frame located within the viewing station at any given time is provided by a five-digit up/down counter 110, which counts and converts input pulses into four-bit binary encoded numbers. The input signals are entered either as blip count signals on leads 441, indicative of actual web locations or as store count signals on lead 85 produced by the reset function in the memory reset network 51. An up/down signal on lead 440 from the direction and pulse count network 68 triggers the five-digit up/down counter 110 in the direction in which the counting is to proceed. A power clear signal on lead 91 is provided to clear the up/down counter upon either initial energization of the apparatus or upon completion of a rewind function. Signals indicative of the counts recorded in the five-digit up/down counter 110 and in the five-digit input register 106 are coupled to a display register 115 through a multiplexing unit 116 driven by the key data flip-flop signal on lead 89 from the memory reset network 51. The display registers 115 may be of any conventional type such as light emitting diode displays produced by Hewlett-Packard, model number 7300. The outputs of the five-digit up/down counter 110 and the five-digit input register 106 are also applied to a five-digit digital comparator 117 which provides three output signals, "equal to" on lead 118, "greater than" on lead 119, and "less than" on lead 120, in response to a comparison between the output from the registers 106 and 110. The "equal to", "greater than" and "less than" signals provide basic signal inputs to the motion control network 53. The inputs to the up/down counter 110 are also coupled to flip-flop 542, to provide additional control signals on leads 544 and 547.

The motion control network 53 comprises the networks and circuits shown in FIGS. 9, 10 and 11. FIG. 9 shows the automatic speed and direction control network 150. The "greater than" signal on lead 119, from the digital comparator 117 provides a reverse command signal via NOR gate 560. The "less than" signal on lead 120 provides a forward command signal to NOR gates 561 and 562. The "equal to," signal on lead 118, provides a stop command signal to NOR gates 565 and 566. The respective signals are combined in a direction control network 165 together with an overflow signal on lead 544, a search enable output signal on lead 86, a rewind command signal on lead 87, and a store or search signal on lead 94 from the memory reset network 51, to provide direction control signals.

An "equals" output is provided on a lead 151 from NOR gate 577 whenever the "equal to" signal on lead 118 appears, and causes a speed control network 160 to change states upon each loss of the "equal to" signal, at the same time causing selective NOR gates 566 and 575 to change states, thereby sequentially producing opposite direction, and slower speed signals on leads 152. Lead 153 provides a reverse low speed command signal. Lead 154 provides a reverse medium speed command signal. Lead 155 provides a reverse high speed command signal. Lead 156 provides a forward high speed command signal. Lead 157 provides a forward medium speed command signal. Lead 158 provides a forward low speed command signal.

The automatic speed and direction control network 150 (FIG. 9) becomes activated upon initiation of a search function. Such an initiation causes the digital comparator 117 (FIG. 8) to compare the desired position entered on the input register 106 with the present position, entered in the counter register 110, and to produce an initial direction command depending upon whether the count in the input register 106 is greater or less than the count in the counter register 110. The initial direction command signals may be either a forward, reverse, or equals, i.e., stop command signals, each of which appear on leads 120, 119 or 118 respectively from the digital comparator 117 to the automatic speed and direction control network 150. Assuming, for purposes of illustration, that a forward command signal on lead 120 is produced initially, it would enable the speed control network 160 to provide a high speed forward output signal on lead 156, enabling web motion until a stop command signal is received on lead 118, as the result of the change in position, which also results in a change in the total count in the input register 106 such that the counts become equal. Upon receipt of a first stop command signal on lead 118, the speed control network 160 is switched, thereby producing a lower speed signal, and a direction control flip-flop 159 is switched to activate an opposite direction signal. Thus a reverse medium speed signal would be produced on lead 154, causing reverse motion to continue until a second stop command signal is received, at which point the transport direction is again reversed and the speed control network i60 switches to a third or low speed state thereby providing a forward low speed command signal on lead 158. Receipt of a third stop command signal, while in a low speed state, causes film motion to stop, as no over-ride will occur. The "equal" signal 151 is also coupled back to the memory reset network 51 where it is coupled through a time discriminator network 95 (FIG. 7), thereby activating the clear circuits only after the equal condition persists for a predetermined length of time indicative that the search has been completed.

The motion control logic network 180, shown in detail in FIG. 10, responds to either of two general sets of input signals, each of which sets provide reverse or forward, and high, medium and low speed inputs. A first set of input signals is from the automatic speed and direction control network 150, and appears on leads 152, while a second set of inputs are produced by the manually operated direction and speed control keyboard 29, each key of which, when depressed, provides a parallel source of speed and direction control signals as that provided on the leads 152. The parallel input leads are coupled together and proceed through the direction logic network 184 to provide the reverse and forward direction control signals on leads 182 and 183 respectively. Medium and low speed command signals are provided on leads 185 and 186 respectively, via the speed logic network 187. The absence of either medium or low speed command signals enables high speed motion. The motion control logic network 180 is also coupled to the preconditioning network 250, to receive a load signal therefrom on lead 322, which signal is coupled via diode 624 to the OR gate 622, in order to activate forward medium speed web motion while the microfilm web is being loaded.

Control panel switch 22, is also provided with an automatic mode off position, for accommodating microfilm not containing position markers. Opening the contacts 189 of switch 22 produces a change in the state of logic network 190 to provide a very low speed command signal on lead 198. Such a very low speed is useful during manual search and scan operations. When film containing position markers is present contacts 189 are closed.

An automatic centering logic circuit 191 contained in the motion control logic network 180, is controlled by the signal from the automatic centering network on lead 446, by the initial automatic centering motion load signal on lead 322 from the preconditioning network 250, and by the non-automatic mode signal produced when contacts 189 are opened. Manual control knob 24 is also provided with a switch, having a set of contacts 192 for applying a +5 volt manual clamp signal to enable the clamp network 193 during manual positioning of the microfilm. The output of the clamp network 193 provides a clamp enable output signal on lead 343 which is coupled to the clamp enable circuit 344 (FIG. 5B), and which produces a signal which releases the film clamp at the viewing station 340. The clamp network 193 also provides a motion enable signal on lead 342 to the motion enable circuit 329 in order to provide continuous tensioning of the microfilm during manual search and scan operations.

The output signal on lead 445 is provided as a feedback loop to the initial automatic centering network 67, in order to enable the automatic centering network 67 and the automatic centering logic circuit 191 only during low speed web transport motion conditions. An input signal is provided on lead 600 while prints are being made of a displayed image frame in order to disable the keyboard 29 during the printing operation.

FIG. 11 shows the speed attenuation network 210 controlled by the output signals on leads 185 and 186 from the speed logic network 187. The attenuation network 210 comprises digital-to-analog conversion circuits in which the reverse and forward direction control signals on leads 182 and 183 are caused to produce as a high speed control signal on lead 321, a plus or minus 5 volt signal, in the absence of any of the lower speed commands. The presence of a medium speed signal on lead 185 causes reed relay 212 to be energized, thereby reducing the current of the output signal on the lead 321 to approximately fifty percent by means of attenuation resistor 213. Similarly, the presence of a low speed signal on the lead 186 activates a reed relay 214 and attenuation resistor 215, thereby reducing the current of the output signal on lead 321 to approximately one to five percent of the initial current. The presence of the very low speed command signal on the lead 198 activates a reed relay 216 and associated attenuation resistor 217, which reduces the current of the output signal to approximately less than two percent of the initial current. The output signal of the speed attenuation network 210 on lead 321 provides the primary control signal which is coupled together with a web motion signal on lead 326 to the operational amplifier 325.

The preconditioning network 250 is shown in FIG. 12. This network produces desired enabling signals in response to the forward command signal on lead 199. In the event no film sense signal is present on the lead 302 at the time the forward command signal appears on the lead 199, thus indicating that no film is present within the takeup reel 303, load signals on leads 290 and 322 are produced; and at the same time a forward enable signal is produced on lead 288 and the reverse enable signal is disabled on lead 289. After a predetermined time delay, during which forward motion has enabled a leading edge of the microfilm web to be engaged within the takeup reel 303, the load signals on leads 290 and 322 are de-energized, thereby deactivating the load solenoid 762 (FIG. 14) and energizing the reverse enable signal on lead 289, thus tensioning the microfilm.

When film having position markers is being used, an end load signal from the end load flip-flop 426 appears on lead 442, which causes a transistor 692 to switch, thereby shortening the predetermined time during which the thread-up mechanism 323 is engaged so as to avoid thread-up past a first position marker.

Figure 13:
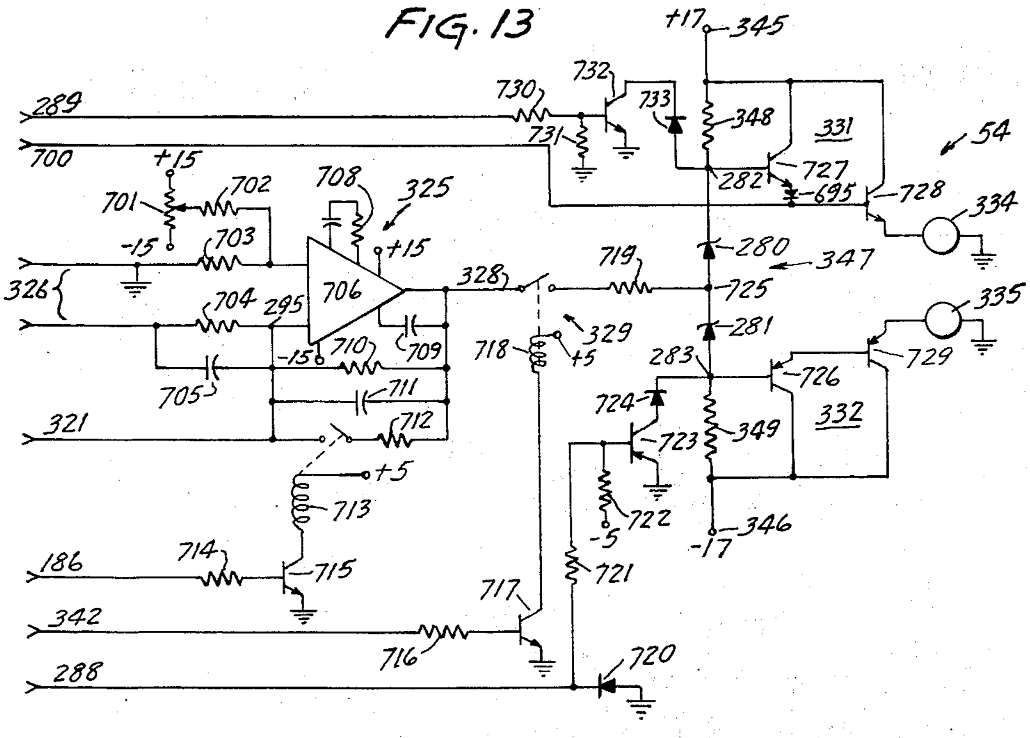
FIG. 13 is a schematic diagram of the transport driving network 54 shown in FIG. 5B and identified therein by the reference numeral 54.

FIG. 13 shows the transport driving network 54. The operational amplifier circuit 325 is coupled to the output of the tachometer 327 via leads 326 and to the speed attenuator network via lead 321. Any difference in the two signals provided on leads 326 and 321 will produce an error signal at the output of the operational amplifier circuit 325 on lead 328. The gain in the operational amplifier 706 is selectively attenuated by a feedback resistor 712 between the input and output of the operational amplifier 706, which resistor 712 is connected therebetween by the contacts of reed relay 713, controlled by the low speed gain control signal on lead 186. The output of the operational amplifier circuit 325 is coupled to a center tap 725 of the non-linear voltage divider network 347 through a motion enable circuit 329. Constant tensioning on the microfilm web during manual positioning operations is assured by the opening of the contacts of relay 718 in response to the absence of a motion enabling signal on lead 342 to thereby decouple the output of the operational amplifier 325 from the non-linear voltage divider network 347, whereby the center tap 725 remains at ground potential. This assures that both of the transport drive motors 334 and 335 receive equal and opposite 3 volt potentials with respect to ground. The non-linear voltage divider network 347 comprises a series circuit in which a matched pair of zener diodes 280 and 281, and voltage dropping resistors 348 and 349 are coupled in series between power source terminals 345 and 346. The additional taps 282 and 283 between zener diode 280 and associated voltage dropping resistor 348, and between zener diode 281 and associated voltage dropping resistor 349 respectively provide sources of control voltage which are coupled through the D.C. current amplifier circuits 331 and 332 to the supply and takeup reel D.C. drive motors 334 and 335. Forward and reverse enabling circuits are also connected between leads 288 and 289 and the additional taps 282 and 283. The enabling circuits control the voltage across each respective motor in response to signals received on the leads 288 and 289. Thus zero potential is applied to both motors 334, 335 when no film sense signal has been produced on lead 302. Only the supply reel drive motor enable signal on lead 288 is provided during loading operations, while both the forward and reverse enabling signals on leads 288 and 289 are provided when film searching or manual positioning is desired.

The non-linear voltage divider network 347 controls the potential applied to each of the D.C. drive motors 334 and 335 in response to the potential of the error signal at center tap 725. Under conditions when no error signal is received, both zener diodes 280 and 281 will be conducting, to maintain both motors 334, 335 at a relatively low but equal and opposite potential to maintain tension on the film. The presence of an error signal of either polarity will cause the center tap 725 to increase or decrease with respect to ground in accordance with the magnitude of the error signal. This increase or decrease causes the control voltages at the additional taps 282 and 283 to similarly increase or decrease. For example, using zener diodes 280, 281 having a zener voltage of 5 volts, the control voltages will maintain a constant plus and minus 5 volts with respect to the error signal up to the point at which a control voltage at either of the additional tap 282, 283 comes within 5 volts of the respective supply voltage source at terminals 345 or 346. The D.C. drive motors 334 and 335 ar coupled between ground and one of the associated positive and negative D.C. current amplifiers 331 and 332, such that when the control voltages vary in accordance with the error signal, each motor is driven at a speed which is a function of the control voltage with respect to ground that is applied to the respective current amplifier 331, 332 driving each motor 334, 335. The microfilm web coupled between the supply and takeup reels 338 and 303 is thereby forced to move in accordance with the motor 334, 335 receiving the greater amount of power. This causes the motor 334, 335 receiving a lesser amount of power to be reversably driven, thereby generating an EMF which when reflected back into its own current amplifier 331, 332 causes the amplifier 331, 332 to look like a resistance load and thereby generate a breaking action within the corresponding motor 334, 335.

In order to insure proper positioning of the supply reel 338 on the spindle 286, a reverse load signal is provided on a lead 700, in response to the load signal on lead 290 (FIG. 14), to momentarily pulse the supply reel motor 334, thereby insuring proper alignment of the supply reel 338 with the motor drive spindle 286.

Figure 14:
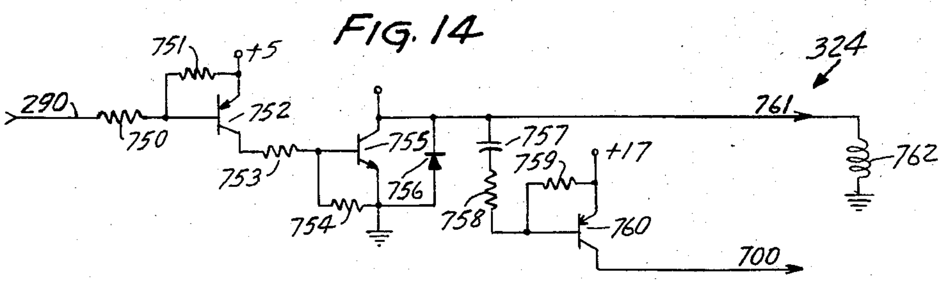
FIG. 14 is a schematic diagram of an automatic threading circuit portion of the automatic thread and film sense circuit shown in FIG. 5B and identified therein by the reference numeral 324.

FIG. 14 shows the automatic threading circuit portion of the automatic thread and film sense circuit 324, wherein a load signal received on lead 290 produces the reverse load signal 700, and also energizes a load solenoid 762 within the automatic threading mechanism 323 to force a drive-out member 341 toward the hub of the supply reel 338, thereby forcing a leading edge of the film web out of the cartridge 23 through the transport path and onto the hub of the takeup reel 303, where it becomes firmly engaged by successive layers of film.

Figure 15:
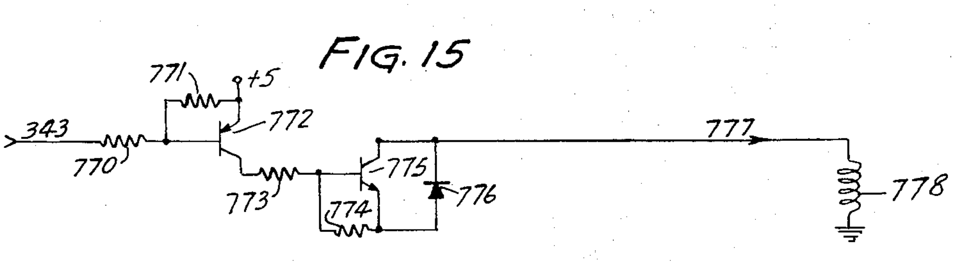
FIG. 15 is a schematic diagram of the clamp enable circuit shown in FIG. 5B and identified therein by the reference numeral 344.

FIG. 15 shows the film clamp enabling circuit 344, which energizes a film clamp solenoid 778 located within the viewing station 340, via lead 777, thereby releasing the film clamp in response to any command initiating film movement.

Components used in the preferred embodiment described in conjunction with FIGS. 6–15 are identified as follows, either by electrical characteristics or commercial designation. While multiunit integrated circuit logic units are shown as extensively used, any logic circuit performing the indicated function is intended to be equivalent.

| Capacitors | Value | Capacitors | Value |
|---|---|---|---|
| **373** | 0.001 μf | **486** | 0.01 μf |
| **375** | 500 pf | **492** | 10 μf |
| **396** | 500 pf | **501** | 0.01 μf |
| **400** | 0.05 μf | **510** | 0.01 μf |
| **412** | 0.05 μf | **519** | 0.1 μf |
| **428** | 0.01 μf | **573** | 0.0015 μf |
| **429** | 0.01 μf | **632** | 30 μf |
| **432** | 0.01 μf | **677** | 10 μf |
| **435** | 0.1 μf | **705** | 0.1 μf |
| **456** | 500 pf | **707** | 500 pf |
| **462** | 500 pf | **709** | 100 pf |
| **468** | 0.047 μf | **711** | 0.15 μf |
| **480** | 500 pf | **757** | 0.047 μf |
| **481** | 5 μf | | |
| **485** | 0.047 μf | | |

| Resistors | Value (ohms unless otherwise indicated) | Resistors | Value (ohms unless otherwise indicated) |
|---|---|---|---|
| **248** | 10 K | **404** | 3.3 K |
| **249** | 10 K | **411** | 4.7 K |
| **350** | 2 K | **427** | 4.7 K |
| **351** | 470 | **430** | 4.7 K |
| **352** | 2 K | **431** | 100 |
| **355** | 1 K | **434** | 560 |
| **356** | 1 K | **450** | 4.7 K |
| **357** | 8.2 K | **451** | 4.7 K |
| **358** | 3.9 K | **452** | 4.7 K |
| **359** | 2 K | **453** | 4.7 K |
| **360** | 1 K | **455** | 10 M |
| **363** | 100 K | **457** | 1 K |
| **365** | 10 K | **461** | 1 M |
| **366** | 5.6 K | **463** | 470 |
| **374** | 1 K | **467** | 10 K |
| **376** | 4.7 K | **469** | 470 |
| **377** | 2 K | **476** | 4.7 K |
| **378** | 470 | **477** | 4.7 K |
| **379** | 2 K | **479** | 4.7 K |
| **382** | 1 K | **482** | 10 K |
| **383** | 1 K | **484** | 1 M |
| **384** | 8.2 K | **487** | 2.7 K |
| **385** | 3.9 K | **489** | 1 K |
| **386** | 2 K | **493** | 8.2 K |
| **387** | 1 K | **494** | 4.7 K |
| **389** | 100 K | **495** | 1 K |
| **391** | 2.2 K | **497** | 22 K |
| **397** | 4.7 K | **500** | 4.7 K |
| **399** | 1 K | **509** | 4.7 K |
| **514** | 4.7 K | **659** | 1 K |
| **517** | 4.7 K | **661** | 470 |
| **541** | 4.7 K | **662** | 2.2 K |
| **568** | 2.2 K | **663** | 1 K |
| **570** | 4.7 K | **665** | 2.2 K |
| **571** | 4.7 K | **666** | 1 K |
| **602** | 680 | **668** | 10 K |
| **603** | 330 | **672** | 330 |
| **605** | 1 K | **675** | 100 |
| **606** | 1 K | **678** | 100 K |
| **607** | 1 K | **680** | 1 K |
| **608** | 1 K | **681** | 1 K |
| **609** | 1 K | **688** | 4.7 K |
| **610** | 1 K | **693** | 1 K |
| **611** | 220 | **701** | 100 K Potentiometer |
| **613** | 3.3 K | **702** | 10 K |

| | |
|---|---|
| 614 | 1 K |
| 631 | 15 K |
| 637 | 1 K |
| 639 | 4.7 K |
| 213 | 3.9 K |
| 215 | 500 |
| 217 | 500 |
| 651 | 1 K |
| 652 | 2.2 K |
| 654 | 2.2 K |
| 655 | 1 K |
| 657 | 470 |
| 658 | 4.7 K |
| 751 | 1 K |
| 753 | 10½ wt |
| 754 | 1 K |
| 758 | 100 K |
| 759 | 100 K |
| 770 | 1 K |
| 771 | 1 K |
| 774 | 1 K |
| 447 | 10 K |
| 166 | 4.7 K |
| 703 | 1.5 K |
| 704 | 1.5 K |
| 708 | 1.2 K |
| 710 | 2.2 M |
| 712 | 10 K |
| Potentiometer 714 | 1 K |
| Potentiometer 716 | 1 K |
| 719 | 220 |
| 721 | 10 K |
| 722 | 47 K |
| 730 | 1 K |
| 731 | 1 K |
| 750 | 1 K |

| Transistors | | |
|---|---|---|
| 353 | 2N3415 | |
| 354 | 2N3415 | |
| 380 | 2N3415 | |
| 381 | 2N3415 | |
| 490 | 2N3415 | |
| 491 | 2N3415 | |
| 572 | 2N3415 | |
| 604 | 2N3644 | |
| 612 | 2N3415 | |
| 653 | 2N3644 | |
| 656 | 2N3415 | |
| 660 | 2N3644 | |
| 664 | 2N3644 | |
| 667 | 2N3644 | |
| 669 | 2N3415 | |
| 679 | 2N3415 | |
| 692 | 2N3415 | |
| 715 | 2N3415 | |
| 717 | 2N3415 | |
| 723 | 2N3644 | |
| 726 | 2N3644 | |
| 727 | 2N3415 | |
| 728 | MJE2500 | Motorola, Inc. |
| 729 | MJE3000 | Motorola, Inc. |
| 732 | 2N3415 | |
| 752 | 2N3644 | |
| 755 | T1P31 | Texas Instruments, Inc. |
| 760 | 2N3644 | |
| 772 | 2N3644 | |
| 775 | T1P29 | Texas Instruments, Inc. |

| DIODES | |
|---|---|
| 280, 281 | 1N5232B |
| 695,756,776 | 1N5059 |
| All other diodes | 1N914 |

The logic gates used in the embodiment described above are selected from the following basic integrated circuits, all of which are manufactured by the Signetics Corp.:

| | |
|---|---|
| 334A | Dual 4 input OR gates |
| 370A | Triple 3 input NOR gates |
| 374A | Triple 3 input OR gates |
| 380A | Quad 2 input NOR gates |
| 384A | Quad 2 input OR gates |
| 387A | Quad 2 input NAND gates |

| Gate Designation | Manufacturer's Model No. |
|---|---|
| 369,370,371,372 | SP380A |
| 392,393,394,395 | SP380A |
| 398,401,402,368 | SP380A |
| 405,406,407,433 | SP380A |
| 408,409,410,414 | SP380A |
| 415,423,561 | SP384A |
| 416,417,422,425 | SP380A |
| 418,419,420,421 | SP380A |
| 424,563 | SP380A |
| 458,459,460,464 | SP380A |
| 465,466,475,515 | SP384A |
| 470,502,503 | SP380A |
| 471,472,474,478 | SP380A |
| 473,507 | SP334A |
| 496,498,499,513 | SP380A |
| 504,505,511,512 | SP384A |
| 506,508,518 | SP380A |
| 107,108,532 | SP387A |
| 533,536,537,538 | SP387A |
| 539 | SP334A |
| 560,577,585,587 | SP380A |
| 562,564,574,583 | SP384A |
| 565,566,575,576 | SP380A |
| 578 | SP374A |
| 581,582,584,586 | SP380A |
| 615,616,621 | SP374A |
| 617,618,629,635 | SP380A |
| 619,620,633,634 | SP384A |
| 622,686,687 | SP374A |
| 623,636,684 | SP370A |
| 625,626,627,628 | SP380A |
| 682,683,685,689 | SP380A |

| | |
|---|---|
| FLIP FLOPS: | |
| 81,82,83,426,542,579,580 | Integrated circuit flip flops, Model SP322B, Signetics Corp. |
| AMPLIFIERS: | |
| 362,388,706 | Operational Amplifiers, Model N5709A, Signetics Corp. |
| MULTIPLEXERS: | |
| 79,105,116 | Quad-2 input Multiplexer, Model N8266B, Signetics Corp. |
| OTHER: | |
| 361a,361b | BCD up-counter, Model N8281A, Signetics Corp. |
| 106 | 4 Bit register, Model SN74175, Texas Instruments, Inc. |
| 110 | BCD up-down counter, Model SN74190, Texas Instruments, Inc. |
| 117 | Digital comparator, Model SN7485, Texas Instruments, Inc. |
| 115 | Display register, Model 7300 Light Emitting Diode display, Hewlett-Packard, Inc. |
| 25 | 10-digit keyboard and function switches: NW-3 series, Microswitch Div. of Honeywell, Inc. |
| 29 | 6 position switch: NW-3 series, Microswitch Div. of Honeywell, Inc. |
| 22 | 3 position, 3 pole switch |
| 212,214,216,713,718 | Reed relays, Model GB651A-05-1, Griggsby-Barton, Inc. |
| PHOTOTRANSISTORS: | |
| 37 | MRD 150 Motorola, Inc. |
| 38 | MRD 150 Motorola, Inc. |

What is claimed is:

1. A microfilm handling apparatus for controlling motion of microfilm webs to position an image frame of said microfilm web in a viewing station, said apparatus comprising;

*a.* supporting means for positioning a supply reel and a takeup reel, said reels being so positioned to support said web in a transport path therebetween;

*b.* dual driving means coupled to said supply and takeup reels respectively for controllably driving said web along said transport path between said reels;

*c.* viewing station means along said transport path through which light is directed and including a focal plane at which an image frame of said web may be positioned for projection by an optical system;

*d.* control means for providing a control signal corresponding to a desired web transport speed and direction of travel;

*e.* sensing means for sensing actual web speed and direction and for providing a web motion signal which varies in accordance with web speed and direction of travel;

*f.* comparing means coupled to the control means and to the sensing means for sensing the difference between the signals thereby provided, and for providing an error signal indicative of said difference; and g. power supply means controlled by said error signal and electrically connected to the driving means to produce web motion in accordance with said error signal, whereby the speed and direction of said web is controlled to position an image frame at the viewing station;

wherein the improvement comprises the power supply means having:

1. means for providing equal positive and negative electrical potential outputs with respect to ground, and
2. non-linear voltage divider network means electrically connected between said positive and negative electrical potential outputs and having a center tap electrically connected to said comparing means and having two additional taps located electrically equidistant from the center tap for providing two controllable sources of potential, the absolute potential of each additional tap being equal with respect to the center tap but having opposite polarity with respect to the center tap, which additional taps are thereby connected to track the error signal and to increase and decrease in accordance with increases and decreases in the error signal; and wherein one of the dual driving means is electrically coupled between ground and one of the additional taps and the other of said dual driving means is electrically coupled between ground and the other of the additional taps to cause power to be differentially applied to each driving means in accordance with said error signal.

2. An apparatus according to claim 1 wherein said supply reel is within a microfilm cartridge and wherein said supporting means further comprises means for accepting and supporting said cartridge, for drivably positioning said supply reel and for automatically engaging and driving a leading end of said web from within said cartridge, and for passing said leading end of said web into said transport path.

3. An apparatus according to claim 2 further comprising film sensing means for detecting said leading end at a point in said path, and for producing a film sense signal in the absence of sensing said microfilm web at said point in said transport path, drive-out drive means positioned adjacent said supply reel and having a first position spaced from the hub of said supply reel and a second position adjacent the hub of said supply reel, and coupling means for moving said drive-out means from said first position to said second position in response to said film sense signal.

4. An apparatus according to claim 1 wherein said dual driving means comprise identical low inertia, non-hysteresis, printed circuit rotor type D.C. motors.

5. An apparatus according to claim 4 wherein said supporting means comprises spindles on which the hubs of said reels are positioned, and wherein said motors are directly coupled to said spindles.

6. An apparatus according to claim 4, further comprising means for momentarily pulsing said motor coupled to said spindle supporting said supply reel upon initiation of a load command signal for producing slight rotation of said spindle supporting said supply reel to ensure correct positioning of said supply reel within said supporting means.

7. An apparatus according to claim 4 wherein said dual driving means further comprises a pair of matched, but opposite polarity, D.C. power amplifier means, each amplifier means having an input coupled to a different one of said controllable sources of potential and an output coupled to a different one of said dual D.C. motors.

8. An apparatus according to claim 7 wherein said dual driving means further comprises means for continuously maintaining tension on said web while said web is moving, wherein one of said D.C. motors receives a greater amount of power, controlling the direction of motion of said web and the other of said D.C. motors receives a lesser amount of power and thereby produces a lesser torque and causes a braking action to maintain said web tension.

9. An apparatus according to claim 1 wherein said control signal providing means comprises a plurality of input means for providing motion command signals and motion control network means activated by said input means for converting said motion command signals into said control signal.

10. An apparatus according to claim 9 wherein said input means comprises a manually operated keyboard means for providing a plurality of speed and direction signals as said motor command signals, any one of which signals is produced in response to activation of a preselected key on said keyboard means and wherein said motion control network means comprises direction and speed control circuits responsive to said speed and direction control signals to produce said control signal.

11. An apparatus according to claim 10 wherein said motion control network means further comprises speed attenuation circuit means for attenuating said direction control signal in accordance with said speed control signals.

12. An apparatus according to claim 1 wherein said sensing means comprises a D.C. tachometer means, the rotor of which is coupled to means responsive to web speed and direction, and the output of which provides said web motion signal.

13. An apparatus according to claim 1 wherein said comparing means comprises an operational amplifier, the input of which is connected to receive said control signal and said web motion signal, and the output of which provides said error signal.

14. An apparatus according to claim 13 further comprising means for controllably altering the gain of said operational amplifier in response to a low speed signal, wherein an increased amplitude error signal is produced in response to a given difference between said control signal and said web motion signal.

15. An apparatus according to claim 1 wherein said non-linear voltage divider network means comprises a four element series circuit connected between said electrical potential outputs, said series circuit having a first resistor, one terminal of which is connected to one of said electrical potential outputs, a first zener diode, the anode of which is connected to the other terminal of said first resistor, a second zener diode having matching electrical characteristics with that of the first zener diode, the anode of which is connected to the cathode of the first zener diode, and a second resistor having an equal resistance as that of the first resistor connected between the cathode of the second zener diode and the other of said electrical potential outputs, thereby completing the series circuit, wherein the connection between the diodes forms said center tap, the connections between said resistors and said diodes form said two additional taps for providing said two controllable sources of potential, and wherein the presence of an error signal at said center tap causes the potential at that point to increase or decrease, causing the potential of said two controllable sources of potential to likewise increase or decrease a like amount.

16. A microfilm handling apparatus for controlling motion of microfilm webs to position an image frame of said microfilm web in a viewing station, wherein said microfilm web contains optically detectable position markers corresponding to the image frames, said apparatus comprising:

*a.* supporting means for positioning a supply reel and a takeup reel, said reels being so positioned to support said web in a transport path therebetween;

*b.* dual driving means coupled to said supply and takeup reels respectively for controllably driving said web along said transport path between said reels;

*c.* viewing station means along said transport path through which light is directed and including a focal plane at which an image frame of said web may be positioned for projection by an optical system;

*d.* light detection means comprising dual light detectors positioned within the viewing station means adjacent said focal plane for optically detecting said position markers and for producing separate position signals corresponding to the degree of presence of a said position marker adjacent the respective dual light detectors;

*e.* web position regulation means controlled by said position signals and electrically coupled to the driving means for energizing the driving means in accordance with said position signals whereby a preselected image frame may be centered in the viewing station for projection of an image from said frame;

wherein the improvement comprises said dual light detectors abutting each other and each light detector having an effective sensing diameter at said focal plane which is not greater than one-half the dimension of a position marker parallel to the direction of travel of said web; and the web position regulation means having automatic centering means coupled to the dual light detectors for comparing said position signals and for producing an automatic centering signal for stopping the driving means when said comparison indicates that a said position marker is positioned over one light detector and not over the other light detector such that a first edge of said position marker is positioned between said detectors whereby when the driving means are thereby stopped, a said image frame is centered within the viewing station means.

17. An apparatus according to claim 16 wherein said viewing station means comprises a first platen means for supporting said web in said focal plane of said projecting system, a second platen means pivotably positioned adjacent said first platen means for firmly clamping said web in said focal plane, and engaging means coupled to said second platen, which engaging means when energized, in response to said automatic centering signal, pivots said second platen to clamp said web.

18. An apparatus according to claim 16 wherein said supporting means further comprises film sense means for sensing the presence of said web on said takeup reel and for producing circuit and network activation signals in response to sensing said presence, whereby the light detection means and the web position regulation means are activated.

19. An apparatus according to claim 18 wherein said web position regulation means further comprises position signal conditioning network means for automatically initially adjusting the threshold sensitivity level of said light detection means in response to said circuit and network activation signals, said position signal conditioning means comprising oscillator means for generating a train of incremental pulses, up-count and digital-to-analog converting means coupled to said oscillator means for counting a number of said incremental pulses and for generating an analog voltage corresponding to said counted number of pulses, comparator means coupled to a said light detector and to a said digital-to-analog converting means for comparing the initial voltage of said position signals prior to the change thereof by the presence of a position marker with said analog voltage and for producing a switching signal when both voltages are substantially equal, reference voltage hold means coupled to said comparator means and to said oscillator means responsive to said switching signal for preventing any additional incremental pulses from being counted by said up-count and digital-to-analog converting means and for establishing a constant reference voltage such that subsequent changes in said position signals are associated with the presence of a position marker.

20. An apparatus according to claim 19 wherein said position signal conditioning network means further comprises adjustable attenuator means coupled to said light detector output and to said comparator for selectively attenuating said position signal, depending upon the light transmissive characteristic of the microfilm web present in the apparatus.

21. An apparatus according to claim 19 wherein said web position regulation means further comprises direction sensing and pulse counting means coupled to said outputs of said dual light detectors for producing a direction of travel signal and a blip-count signal in response to said position signals.

22. An apparatus according to claim 21 wherein said web position regulation means further comprises first blip control means responsive to said circuit and network activation signals for actuating initiation commands and for preventing the production of a said blip-count signal in response to changes in said dual light detector output produced by the initial presence of the web at said viewing station means.

23. An apparatus according to claim 19 wherein said web position regulation means further comprises a plurality of input means for providing desired web position command signals, signal comparison means coupled to said position signal conditioning network means and to said input means for comparing said position signal with said desired web position command signal and for providing an automatic motion command signal in response to said comparison.

24. An apparatus according to claim 23 wherein said input means comprises digital keyboard means for entering a digital number corresponding to a preselected image frame, which number corresponds with the position of said preselected image frame on said web, and for generating a digital signal characteristic thereof, binary conversion means for converting said digital signal to a binary logic signal, wherein said position signal conditioning network means further comprises up/-down count register means for accumulating a count corresponding to an image frame in said viewing station means in accordance with said direction of travel signal and said blip-count signal, and wherein said signal comparison means comprises a digital comparator for producing reverse, forward and stop command signals as said automatic motion command signal.

25. An apparatus according to claim 24 wherein said web position regulation means further comprises motion control network means responsive to said automatic motion command signal for controlling said driving means in accordance with said motion command signal, wherein said motion control network means comprise automatic speed and direction control network means responsive to said reverse, forward and stop command signals for producing discrete forward and reverse direction signals, corresponding to a desired high, medium and low forward and reverse directions of web motion and wherein each appearance of a stop command signal causes the production of an opposite direction and slower speed signal, motion control logic network means responsive to said discrete forward and reverse direction signals producing direction logic signals and attenuation control signals, and speed attenuation circuit means responsive to said attenuation control signals and said direction logic signals having a plurality of parallel attenuation circuits, different combinations of which provide different attenuation ratios upon being selectively energized by one of said attenuation control signals, for producing a single control signal, the polarity of which is indicative of a desired direction of web motion and the magnitude of which varies in discrete increments corresponding to said selective energization of said plurality of parallel attenuation circuits.

26. An apparatus according to claim 25 wherein said input means further comprises manual keyboard means for producing said discrete forward and reverse direction signals, outputs of said manual keyboard means being coupled to said motion control network in parallel with the outputs of said automatic speed and direction control network means.

27. An apparatus according to claim 25 wherein said web position regulation means further comprises supply means controlled by said single control signal and electrically connected to said driving means, said supply means having 1. means for providing equal positive and negative electrical potential outputs with respect to ground, and
2. non-linear voltage divider network means electrically connected between said positive and negative electrical potential outputs and having a center tap electrically connected to said comparing means and having two additional taps located electrically equidistant from the center tap for providing two controllable sources of potential, the absolute potential of each additional tap being equal with respect to the center tap but having opposite polarity with respect to the center tap, which additional taps are thereby connected to track the error signal and to increase and decrease in accordance with increases and decreases in the error signal; and wherein one of the dual driving means is electrically coupled between ground and one of the additional taps and the other of said dual driving means is electrically coupled between ground and the other of the additional taps to cause power to be differentially applied to each driving means in accordance with said error signal.

28. An apparatus according to claim 27 wherein said apparatus further comprises tachometer means, the output of which is responsive to web speed and direction for providing a web motion signal and wherein said web position regulation means further comprises operational amplifier comparison means coupled to said speed attenuation circuit means and to said tachometer for comparing said web motion signal and said single control signal for producing an error signal characteristic of differences therebetween.

29. An apparatus according to claim 28 wherein said non-linear voltage divider network means comprises a four element series circuit connected between said electrical potential outputs, said series circuit having a first resistor, one terminal of which is connected to one of said electrical potential outputs, a first zener diode, the anode of which is connected to the other terminal of said first resistor, a second zener diode having matching electrical characteristics with that of the first zener diode, the anode of which is connected to the cathode of the first zener diode, and a second resistor having an equal resistance as that of the first resistor connected between the cathode of the second zener diode and the other of said electrical potential outputs, thereby completing the series circuit, wherein the connection between the diodes forms said center tap, the connections between said resistors and said diodes form said two additional taps for providing said two controllable sources of potential, and wherein the presence of an error signal at said center tap causes the potential at that point to increase or decrease, causing the potential of said two controllable sources of potential to likewise increase or decrease a like amount.

30. An apparatus according to claim 27 wherein said supporting means comprises spindles on which the hubs of said reels are positioned, and wherein said dual driving means comprise identical low inertia, non-hysteresis printed circuit rotor type D.C. motors.

31. An apparatus according to claim 30 wherein said driving means further comprises a pair of matched, but opposite polarity D.C. power amplifier means, each amplifier means having an input coupled to one of said controllable sources of potential and an output coupled to one of said D.C. motors.

32. An apparatus according to claim 31 wherein said dual driving means further comprises means for continuously maintaining tension on said web while said web is moving, wherein one of said D.C. motors receives a greater amount of power, controlling the direction of motion of said web and the other of said D.C. motors receives a lesser amount of power and thereby produces a lesser torque and causes a braking action to maintain said web tension.

* * * * *